US012746512B2

(12) United States Patent
Atencia et al.

(10) Patent No.: US 12,746,512 B2
(45) Date of Patent: Sep. 29, 2026

(54) FLUID FILTRATION DEVICE

(71) Applicant: PathOtrak Inc., College Park, MD (US)

(72) Inventors: Javier Atencia, Bethesda, MD (US); Ethan Reggia, Beltsville, MD (US)

(73) Assignee: pathOtrak Inc., College Park, MD (US)

( * ) Notice: Subject to any disclaimer, the term of this patent is extended or adjusted under 35 U.S.C. 154(b) by 15 days.

(21) Appl. No.: 19/107,446

(22) PCT Filed: Aug. 30, 2024

(86) PCT No.: PCT/US2024/044724
§ 371 (c)(1),
(2) Date: Feb. 27, 2025

(87) PCT Pub. No.: WO2025/049942
PCT Pub. Date: Mar. 6, 2025

(65) Prior Publication Data

US 2026/0001038 A1 Jan. 1, 2026

Related U.S. Application Data

(60) Provisional application No. 63/536,288, filed on Sep. 1, 2023.

(51) Int. Cl.
*B01D 61/14* (2006.01)
*B01D 61/18* (2006.01)
*B01D 63/08* (2006.01)

(52) U.S. Cl.
CPC ........... *B01D 61/147* (2013.01); *B01D 61/18* (2013.01); *B01D 63/08* (2013.01); *B01D 2313/08* (2013.01); *B01D 2313/13* (2013.01)

(58) Field of Classification Search
None
See application file for complete search history.

(56) References Cited

U.S. PATENT DOCUMENTS 3,079,001 A 2/1963 Griffith
4,829,002 A 5/1989 Pattillo et al.
(Continued)

FOREIGN PATENT DOCUMENTS

CA 3126717 A1 7/2020
GB 2189404 A 10/1987
(Continued)

OTHER PUBLICATIONS

PCT Search Report and Written Opinion issued in connection with corresponding PCT Application No. PCT/US19/49717 mailed on Nov. 19, 2019, 8 pages.
(Continued)

*Primary Examiner* — Richard C Gurtowski
(74) *Attorney, Agent, or Firm* — Schwegman Lundberg & Woessner, P.A.

(57) ABSTRACT

Described herein are systems, devices, and methods for filtering a fluid. The fluid may include or may be suspected to include a particle. The systems may include a filtration housing and a filter at least partially compressed within the housing. Compression of the filter set by the housing may result in a gradation of effective pore sizes of the filter, allowing for particles of various sizes to be captured within the filter. The compression may additionally increase an effective surface area of the filter and allow for multidirectional flow of the fluid through the filter. The methods for use and manufacture of the filtration systems and devices may include arranging the filter within the housing such that at least a portion of the filter is compressed within the housing and a desired effective pore size of the filter is achieved.

20 Claims, 13 Drawing Sheets

(56) References Cited

U.S. PATENT DOCUMENTS

| | | | |
|---|---|---|---|
| 5,965,019 A | 10/1999 | Olsen et al. | |
| 6,139,757 A | 10/2000 | Ohmura et al. | |
| 6,274,055 B1 | 8/2001 | Zuk | |
| 7,547,526 B2 | 6/2009 | Ladisch et al. | |
| 11,634,782 B2 | 4/2023 | Stephens | |
| 12,392,694 B2 | 8/2025 | Javier et al. | |
| 2001/0034058 A1 | 10/2001 | Kopf | |
| 2004/0232171 A1 | 11/2004 | Bobst | |
| 2005/0244943 A1 | 11/2005 | Ladisch et al. | |
| 2006/0199260 A1 | 9/2006 | Zhang et al. | |
| 2010/0084270 A1 | 4/2010 | Vulto et al. | |
| 2010/0255484 A1 | 10/2010 | Halverson et al. | |
| 2011/0059462 A1 | 3/2011 | Lim et al. | |
| 2014/0175029 A1 | 6/2014 | Niazi | |
| 2015/0118688 A1 | 4/2015 | Weidemaier et al. | |
| 2015/0152375 A1 | 6/2015 | Hedrick et al. | |
| 2015/0252314 A1 | 9/2015 | Onji et al. | |
| 2015/0253226 A1 | 9/2015 | Augustsson et al. | |
| 2016/0137970 A1 | 5/2016 | Hedrick et al. | |
| 2017/0022470 A1 | 1/2017 | Calemczuk et al. | |
| 2017/0121758 A1 | 5/2017 | Atencia-Fernandez | |
| 2017/0273670 A1 | 9/2017 | Rostaing et al. | |
| 2017/0291132 A1* | 10/2017 | Schwartz | B01D 46/10 |
| 2018/0117236 A1 | 5/2018 | Zhou et al. | |
| 2018/0154286 A1 | 6/2018 | Dorian | |
| 2018/0180611 A1 | 6/2018 | Ladisch et al. | |
| 2018/0230552 A1 | 8/2018 | Goletz et al. | |
| 2021/0102234 A1 | 4/2021 | Atrache et al. | |
| 2021/0346651 A1* | 11/2021 | Lerner | A61M 5/52 |
| 2021/0346843 A1 | 11/2021 | Atencia-Fernandez | |
| 2022/0178799 A1 | 6/2022 | Atencia-Fernandez et al. | |

FOREIGN PATENT DOCUMENTS

| | | |
|---|---|---|
| JP | WO2018003476 A1 | 1/2019 |
| WO | WO-2015187745 A1 | 12/2015 |
| WO | WO-2018003476 A1 | 1/2018 |
| WO | WO-2020051311 A1 | 3/2020 |
| WO | WO-2020210772 A1 | 10/2020 |
| WO | WO-2024118996 A2 | 6/2024 |
| WO | WO-2025049942 A1 | 3/2025 |

OTHER PUBLICATIONS

Baker, R.W. "7 Microfiltration," Membrane Technology and Applications, Third Edition, John Wiley & Sons, Jan. 1, 2012, 303-324.
Blasing et al., "Plastics in soil: Analytical methods and possible sources", Science of the Total Environment, 2018, 612:422-435.
Brehm-Stecher, et al., "Sample Preparation: The Forgotten Beginning," Journal of Food Protection, 2009, 72(8), 1774-1789.
Brewster "Large-Volume Filtration for Recovery and Concentration of *Escherichia coli* O157:H7 from Ground Beef", Journal of Rapid Methods & Automation in Microbiology, 2009, 17(2):242-256.
Chen et al., "Mechanistic Study of Membrane Concentration and Recovery of Listeria monocytogenes", Biotechnology and Bioengineering, vol. 89, No. 3, 2005, 263-273.
Extended European Search Report for Application No. EP20788458.6, dated Nov. 29, 2022, 10 pages.
Extended European Search Report for European Application No. 24196297.6 mailed Feb. 21, 2025, 11 pages.
Fachmann et al., "Detection of Salmonella in meat in less than 5 hours by a low-cost and non-complex sample preparation method", Applied and Environmental Microbiology, 2017, 83(5):1-34.
Faradji et al., "Large scale isolation of human blood monocytes by continuous flow centrifugation leukapheresis and counterflow centrifugation elutriation for adoptive cellular immunotherapy in cancer patients", Journal of immunological methods, 1994, 174(1-2):297-309 (3 pages only).
Final Office Action for U.S. Appl. No. 17/274,000 dated May 15, 2024, 19 pages.
Fukushima et al., "Rapid Separation and Concentration of Food-Borne Pathogens in Food Samples Prior to Quantification by Viable-Cell Counting and Real-Time PCR", Applied and Environmental Microbiology, 2007, 73(1):92-100.
Hurley et al., "Validation of a Method for Extracting Microplastics from Complex, Organic-Rich, Environmental Matrices", Environmental Science & Technology, 2018, 52(13):7409-7417.
International Preliminary Report on Patentability issued in PCT/US2019/049717 dated Mar. 9, 2021, 6 pages.
International Preliminary Report on Patentability issued in PCT/US2020/027863 dated Sep. 28, 2021, 6 pages.
International Preliminary Report on Patentability for PCT Application No. PCT/US2023/081957 mailed Jun. 12, 2025, 15 pages.
International Search Report and Written Opinion for International Application No. PCT/US2023/081957 dated May 6, 2024, 18 pages.
International Search Report issued in PCT/US2020/027863 dated Jun. 17, 2020, 4 pages.
Invitation to pay additional fees for International Application No. PCT/US2023/081957, dated Feb. 16, 2024, 2 pages.
Invitation to pay additional fees for International Application No. PCT/US2024/044724, mailed Nov. 12, 2024, 2 pages.
Jaffrin, "Dynamic shear-enhanced membrane filtration: A review of rotating disks, rotating membranes and vibrating systems", J. Membr. Sci., 2008, 324:7-25.
Kim et al., "Dynamic microfiltration with a perforated disk for effective harvesting of microalgae", J. Membr. Sci., 2015, 475:252-258.
Non-final Office Action issued in U.S. Appl. No. 17/274,000 dated Dec. 26, 2023, 21 pages.
Non-final Office Action issued in U.S. Appl. No. 17/274,000 dated Dec. 6, 2024, 17 pages.
Non-final Office Action issued in U.S. Appl. No. 17/274,000 dated Mar. 6, 2025, 18 pages.
Non-final Office Action issued in U.S. Appl. No. 17/603,248 dated Dec. 10, 2024, 27 pages.
Notice of Acceptance for Australian Application No. 2020271134 mailed Mar. 26, 2025, 3 pages.
Notice of Acceptance for Australian Application No. 2019335303 dated Jun. 26, 2025, 3 pages.
Notice of Allowance for U.S. Appl. No. 17/603,248 mailed Jul. 2, 2025, 13 pages.
Office Action for Australian Application No. 2020271134 mailed Nov. 29, 2024, 3 pages.
Office Action for Australian Application No. AU20190335303 mailed Jul. 3, 2024, 3 pages.
Office Action for Canadian Application No. CA 3,136,712 dated Apr. 17, 2023, 7 pages.
Office Action for Canadian Patent Application No. CA3136712 dated Feb. 16, 2024, 5 pages.
Pessoa et al., "Evaluation of cross-flow microfiltration membranes using a rotary disc-filter", Process Biochem., 1998, 33:39-45.
Purchas, D.B. et al. "Handbook of filter media," Handbook of Filtered Media Referex; Elsevier Advanced Technology, Oxford, Oct. 28, 2002, Retrieved from the internet at https://ebookcentral.proquest.com/lib/epo-ebooks/detail.action?docID=316908&query=978-1-85617-375-9, retrieved on Oct. 1, 2015, 551 pages.
Rios et al., "Dynamic Microfiltration in Microalgae Harvesting for Biodiesel Production", Ind. Eng. Chem. Res., 2011, 50:2455-2460 (7 pages total).
Sanchez-Nieva et al., "A new analytical technique for the extraction and quantification of microplastics in marine sediments focused on easy implementation and repeatability", Analytical Methods, 2017, 9(45):6371-6378.
Supplemental European Search Report issued in EP Application No. 19858459.1 dated Apr. 20, 2022, 7 pages.
Tiemann et al., "Elutriation: Theoretical Considerations and Methodological Improvements", Marine Ecology—Progress Series, 1979, 1:277-281.
Turpin et al., "Centrifugal elutriation as a method for isolation of large Nos. of functionally intact human peripheral blood monocytes", Journal of clinical apheresis, 1986, 3(2):111-118 (2 pages total).
Wang et al., "Culture-Independent Rapid Detection Methods for Bacterial Pathogens and Toxins in Food Matrices", Comprehensive Reviews in Food Science and Food Safety, 2016, 15(1):183-205.

(56) References Cited

OTHER PUBLICATIONS

Wolffs et al., "Direct Quantitation and Detection of Salmonellae in Biological Samples without Enrichment, Using Two-Step Filtration and Real-Time PCR", Applied and Environmental Microbiology, 2006, 72(6):3896-3900.
International Search Report and Written Opinion issued in PCT/US2024/044724, date of mailing Jan. 8, 2025, 18 pages.
U.S. Appl. No. 19/134,457, filed May 30, 2025; inventor Atencia, Javier.

* cited by examiner

FLUID FILTRATION DEVICE

RELATED APPLICATIONS

This application is a U.S. National Phase Application under 35 U.S.C. § 371 of International Patent Application No. PCT/U2024/044724, filed Aug. 30, 2024, which claims priority to, and the benefit of, U.S. Provisional Application No. 63/536,288 filed on Sep. 1, 2023. The contents of the aforementioned applications are incorporated herein by reference in its entirety.

STATEMENT REGARDING FEDERALLY SPONSORED RESEARCH

This invention was made with government support under NSF SBIR Phase II, award number 2127054, awarded by the National Science Foundation. The government has certain rights in the invention.

TECHNICAL FIELD

The disclosures herein relate generally to systems, devices, and methods for filtering a fluid. The systems, devices and methods may be used for multidirectional microfiltration of particles from a fluid.

BACKGROUND

In the field of food processing, ensuring the safety and quality of food products is of paramount importance. The spread of foodborne illnesses may be prevented through careful monitoring of food by producers and sellers, and detection of foodborne microbes present in food processing lots. One critical aspect of food processing involves filtering sample fluids (e.g., fluids having received a portion of a food product) to collect, identify, and remove foodborne microbes. Currently, various technologies are employed for fluid filtration, such as membrane filtration, which involves passing the sample fluid through one or more porous membranes that retain bacteria and other microorganisms, allowing for their subsequent identification and analysis. Dependable filtration system performance is essential in food processing for safety and for efficient fluid filtering. Rapid filtration methods may reduce the time required for sample processing, enabling quicker analysis of food samples and expedited identification of potential pathogens. Additionally, swift identification of pathogens may allow for timely intervention and implementation of appropriate measures to prevent contaminated food from reaching consumers, minimizing the risk of foodborne outbreaks. Further, faster fluid filtering may contribute to improved productivity in food processing facilities. By reducing the filtration time, the overall throughput of samples may be increased, leading to higher production volumes without compromising quality assurance. This increased productivity may translate into better supply chain management, reduced costs, and enhanced customer satisfaction.

Effective filtration is dependent on effective membrane pore size and effective surface area of a set of filter membranes. Many membrane filtration systems achieve high surface area by using large pieces of filtration media (i.e., the variety of materials that can be used to achieve any one of mechanical filtration, chemical filtration, and/or biological filtration) or through contortions of the media (e.g., pleating). However, manufacturing large and/or pleated pieces of filtration media can be complex and expensive. Additionally, these filtration systems often induce unilateral flow of a fluid sample through a filter. Unilateral flow systems notoriously experience caking of large particles within small pores of the filter, resulting in clogs that hinder filtration. Consequently, using current systems, regular replacement of the filtration media may be necessary to address caking, and multi-step filtration (e.g., filtering a fluid through filter membranes having different pore sizes over multiple steps) may be required to filter complex samples (e.g., samples having particles of various sizes). Moreover, many systems employ nonspecialized and/or various types of filter media and lack means for controlling variance in filter characteristics (e.g., effective pore size) resulting from variance in manufacturing procedures, which may yield inconsistent filtration performance. Further, these systems may also be sensitive to defects in filters (e.g., tears, punctures).

Thus, although consistent filtration performance is essential for food processing applications, conventional systems may not be optimized for rapid, consistent performance due to fluid flow paths induced and/or expensive filters having variable characteristics. These issues may increase risk of food consumption by consumers, and may cause delays for sale of certain foods, which is problematic considering the short shelf life of many fresh food items (e.g., meat, produce, dairy products, etc.). Accordingly, there is a need for new and improved systems, devices and methods for fluid filtering.

BRIEF SUMMARY

Described herein are systems, devices, and methods for filtering a fluid. The systems, devices and methods may be used for multidirectional microfiltration of particles from a fluid. The microfiltration may be part of a food processing procedure.

The microfiltration system may include: a housing having a top portion with a platform and a first extension coupled to and extending from the platform, and a base portion with a base having a fluid outlet extending therethrough; and a second extension coupled to and extending from the base. The first and second extensions may be configured to be coupled, and when the first and second extensions are coupled, the housing may be configured to hold a filter set between the platform and the base such that at least a portion of the filter set is compressed between the platform and the base.

In some variations, the first extension may include a first lateral portion and a first vertical portion, and the second extension may include a second lateral portion and a second vertical portion. The first and second lateral portions may extend parallel to each other along a lateral axis of the housing. In some variations, the first and second lateral portions extend radially along the lateral axis. In other variations, the first lateral portion may include a first inner end coupled to the platform and a first outer end coupled to the first vertical portion, and the second lateral portion may include a second inner end coupled to the base and a second outer end coupled to the second vertical portion. In some variations, the first and second lateral portions may have the same length. The first vertical portion may extend distally along a longitudinal axis of the housing, and the second vertical portion may extend proximally along the longitudinal axis. In some variations, the first and second vertical portions may have the same length. In other variations, the first and second extensions may be couplable via the first and second vertical portions. Each of the first and second extensions may include at least two legs configured to align relative to each other and configured to couple together. In some variations, the top portion may include a fluid inlet configured to receive a fluid. In some variations, the base may be proximally offset from an interior wall of the base portion. The base may also extend distally from an exterior wall of the base portion. The housing may include one or more of a flexible material, a semi-flexible material, a semi-rigid material, and a rigid material. In some variations, the housing may be a chamber configured to enclose the filter set. In other variations, the housing may be a cage configured to expose the filter set. The filter set may be configured to filter a fluid comprising or suspected to comprise a microbe. In some variations, a cross sectional width or diameter of the housing may be about equal to or greater than a cross sectional width or diameter of the filter set. In some variations, a height of the housing may be about equal to or greater than a thickness of the filter set.

In some variations, the first and second extensions may be couplable via one or more of a press-fit, a snap-fit, a magnet, a fastener, a rotational coupling, an adhesive, and welding. The welding may include friction welding.

The platform may be distally offset from an interior wall of the top portion. In some variations, the platform may be coupled to the interior wall of the top portion via one or more struts.

The filter set may include a first membrane having a proximal surface and a first sidewall and a second membrane having a distal surface and a second sidewall. In some variations, an exterior of the filter set may include at least the proximal surface, the distal surface, and the first and second sidewalls, and the housing may be configured to expose a majority of the exterior of the filter set. Each of the proximal surface, the distal surface, and the first and second sidewalls may include an exposed portion configured to receive a fluid and an unexposed portion covered by an area of the housing. Further, the proximal surface of the first membrane may be adjacent the top portion and the distal surface of the second membrane may be adjacent the base portion.

The compressed portion of the filter set may be aligned with a center of the housing, and an uncompressed portion of the filter set may be peripheral to the compressed portion. In some variations, the uncompressed portion of the filter set may extend laterally and radially from the compressed portion. In some variations, the compressed portion may include a first thickness, the uncompressed portion may include a first end adjacent the compressed portion and a second end lateral to the first end and adjacent a sidewall of the filter set, where the second end may include a second thickness, and where the first thickness may be less than the second thickness. In other variations, a thickness of the filter set may increase from the first end of the uncompressed portion to the second end of the uncompressed portion.

In some variations, the filter set may include membranes having an average effective pore size that varies along a lateral axis of the housing when the filter set is between the platform and the base. The compressed portion of the filter set may include a smallest average effective pore size of the filter set.

The microfiltration system may additionally include an enclosure configured to receive a fluid and guide the fluid toward the filter set within the housing. The enclosure may include one or more of a flexible material, a semi-flexible material, a semi-rigid material, and a rigid material. In some variations, the enclosure may include a bag. The enclosure may include an outlet configured to releasably couple to a portion of the housing. In some variations, at least a portion of the outlet may be exterior to the enclosure and configured to couple to a fluid inlet of the top portion of the housing. In other variations, at least a portion of the outlet may be within the enclosure and configured to couple to the fluid outlet of the base portion of the housing.

The method for filtering a fluid may be performed using a microfiltration system. The method may include: arranging a filter set within a housing, the housing having a top portion with a platform and a first extension coupled to and extending from the platform, and a base portion having a base having a fluid outlet extending therethrough and a second extension coupled to and extending from the base. The top and bottom portions may be configured to be coupled, and the housing may be configured to hold the filter set such that at least a portion of the filter set is compressed between the platform and the base. The method may then include adjusting a compression of the filter set, and flowing the fluid through the microfiltration system, where the fluid includes or is suspected to include a particle.

Adjusting the compression may include changing a distance between the platform and the base. In some variations, changing the distance may include adjusting a coupling at an interface between the first extension and the second extension. Moreover, adjusting the compression may include changing a number of membranes within the filter set to change a thickness of the filter set. Further, adjusting the compression may adjust an effective pore size and an effective surface area of the filter set. The method may additionally include, prior to flowing the fluid through the microfiltration system, flowing the fluid through an enclosure configured to couple to the housing, and pressurizing the enclosure to guide the fluid is forced toward the housing and the filter set.

The particle may include one or more food particles, or may include one or more microbes.

A method for manufacturing a microfiltration system may include: aligning a top portion and a base portion of a housing, the top portion having a platform and a first extension coupled to and extending from the platform, and the base portion having a base with a fluid outlet extending therethrough and a second extension coupled to and extending from the base; arranging a filter set between the top portion and the base portion; and coupling the top portion and the base portion such that at least a portion of the filter set is compressed between the platform and the base.

Coupling the top and base portions may include coupling the first and second extensions. Moreover, coupling the top and base portions may adjust an effective pore size and an effective surface area of the filter set therebetween. In some variations, coupling the top and base portions may include using one or more of a press-fit, a snap-fit, a magnet, a fastener, a rotational coupling, an adhesive, and welding. The welding may include one or more of friction welding, laser welding, thermal impulse welding, solvent welding, and infrared welding. The friction welding may include one or more of friction stir welding, friction stir spot welding, linear friction welding, and ultrasonic welding.

DETAILED DESCRIPTION

Figure 1:
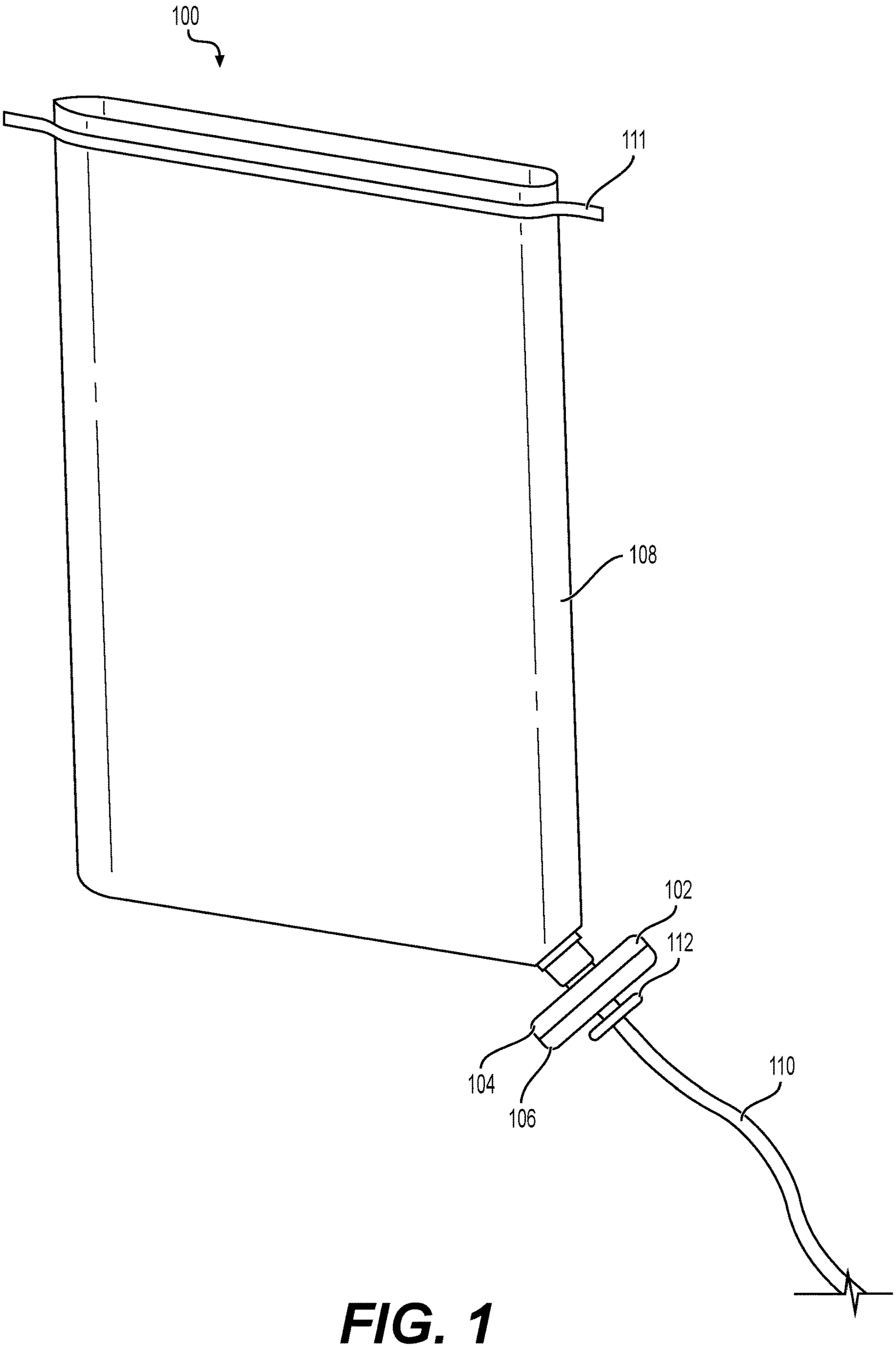
FIG. 1 depicts a perspective view of a filtration system, according to variations herein.

This application relates to systems, devices, and methods for filtering a fluid. The fluid may include or may be suspected to include a particle, such as a food particle, a microbe, a pathogen, or any other contaminant. The particle may be separated from a liquid portion of the fluid through a filter. Effective filtration is dependent on filter membrane effective pore size and effective surface area. As described herein, the filter may comprise a plurality of filter membranes, an effective pore size and effective surface area of the plurality of filter membranes being adjustable based on a compression of the filter. Thus, the filter may have a nominal pore size and nominal surface area at rest (i.e., absent compression of the filter), and an effective ("compressed") pore size and effective ("increased") surface area depending on an adjustable compression of the filter. Thus, the systems, devices, and methods herein may accommodate fluid samples having particles of vastly different size scales, may expedite a filtration process, and may increase a resulting filtrate volume, thereby addressing several issues with conventional membrane filtration techniques.

For example, performance of traditional systems for size-exclusion filtration, or sieving, may be diminished due to filter defects, variance in filter characteristics due to manufacturing procedures, caking of particles within filter membranes, and/or attempting to achieve high surface area systems by inducing unilateral flow of fluid samples through thick or pleated filter membranes. In contrast, the systems and methods described herein may be generally resistant to filter defects, variance in filter characteristics, and caking of particles within filters. To this end, the systems and methods herein may induce multidirectional flow of fluid samples through thin sheets of filter media to achieve a higher effective filtration area than conventional systems.

The present disclosure describes adjusting a compression of a filter (e.g., a stacked set of thin filter membranes) to control an effective membrane pore size (e.g., minimum pore size, average pore size, pore size gradient) and to increase an effective filtration surface area of the filter. The adjustable compression may enable a user to maintain filtration performance semi-independently of the filter media's manufacturing consistency by enabling control of effective membrane pore size. In addition, the user may be able to configure the effective pore size of the filter to correspond to an expected range of particle sizes within a given sample fluid. Specifically, compressing the filter may decrease the effective membrane pore size within a compressed portion of the filter. The compressed portion of the filter may then be configured as a primary filtration zone having smaller effective pore sizes relative to an uncompressed portion of the filter, creating a filtration gradient within the filter. The filtration gradient may allow large particles within a sample fluid to be captured within the uncompressed portion, and relatively smaller particles to be captured within the compressed portion. Thus, the filtration gradient may prevent large particle caking. For example, the compressed portion may be a central portion of the filter, and the uncompressed portion may be a peripheral portion of the filter that radially surrounds the compressed portion. The compressed portion may have a substantially same effective pore size throughout, and the uncompressed portion may have a gradient of pore sizes that are largest at the edge of the uncompressed portion and smallest immediately adjacent the compressed portion. In this case, the largest particles of a sample fluid may be captured close to the edge of the filter, and the smallest particles may be captured close to and within the center of the filter. Alternatively, the compressed portion may have a varying effective pore size throughout depending on the geometry of the devices and systems described in further detail herein.

Compression of the filter may also cause the uncompressed portion to splay and separate such that both of a proximal (top side) and distal (underside) surface of the filter may be configured to receive and filter a fluid sample. For example, when a filter includes at least two stacked membranes, compression of a central portion of the filter may cause the membranes within a peripheral, uncompressed portion of the filter to separate from each other (i.e., along a longitudinal axis defined by the filter) such that larger surface areas of a distal surface of a first filter and a proximal surface of a second filter beneath the first are revealed. Separation of the filter membranes may allow for fluid to access and ultimately be filtered multi-directionally through the uncompressed portion of the filter, thus increasing the effective filtration area of the filter. Thus, there may be a high probability of filtering large particles within the uncompressed portion of the filter, further reducing chances of particle caking and filter clogs. Increasing the effective surface area of the filter and inducing multi-directional fluid flow may allow for a fluid sample to flow faster through the systems described herein, providing faster fluid filtration than conventionally employed unidirectional flow sieving systems. Moreover, the filter may be resistant to membrane defects because the primary filtration zone is at the interface of compressed filter media, not across a particular piece of media.

It may be beneficial to elaborate on the term "multidirectional flow" as used herein throughout. Generally, fluid flow induced by the systems and methods described herein may include a path through at least a portion of a filter and, subsequently, through a fluid outlet of a filtration housing. Assuming efficient flow (and disregarding Brownian motion or other random flow events), all particles that enter and exit the filtration systems described herein will be volumetrically filtered through a distance of filter media somewhere between the scenarios illustrated in FIGS. 2A and 2B, which depict two exemplary multidirectional fluid flow paths through filtration systems 200, 220, according to variations herein. Several features of filtration housings 210, 230 may help to induce such flow. For example, filtration housings

210, 230 having an inner dimension (e.g., a width or diameter) that is greater than an outer dimension (e.g., a width or diameter) of filters 202, 222 may allow a fluid sample to flow at least partially around the filters 202, 222 and enter the filters along any one of the filter membranes. The fluid may then flow tangentially along the membrane(s), and subsequently longitudinally through the membrane(s) toward fluid outlets 214, 234. As another example, raised bases 212, 232 of the housings 210, 230 may prevent unfiltered fluid collected at the bottom of chambers 208, 238 from flowing through the fluid outlets 214, 234.

Figure 2B:
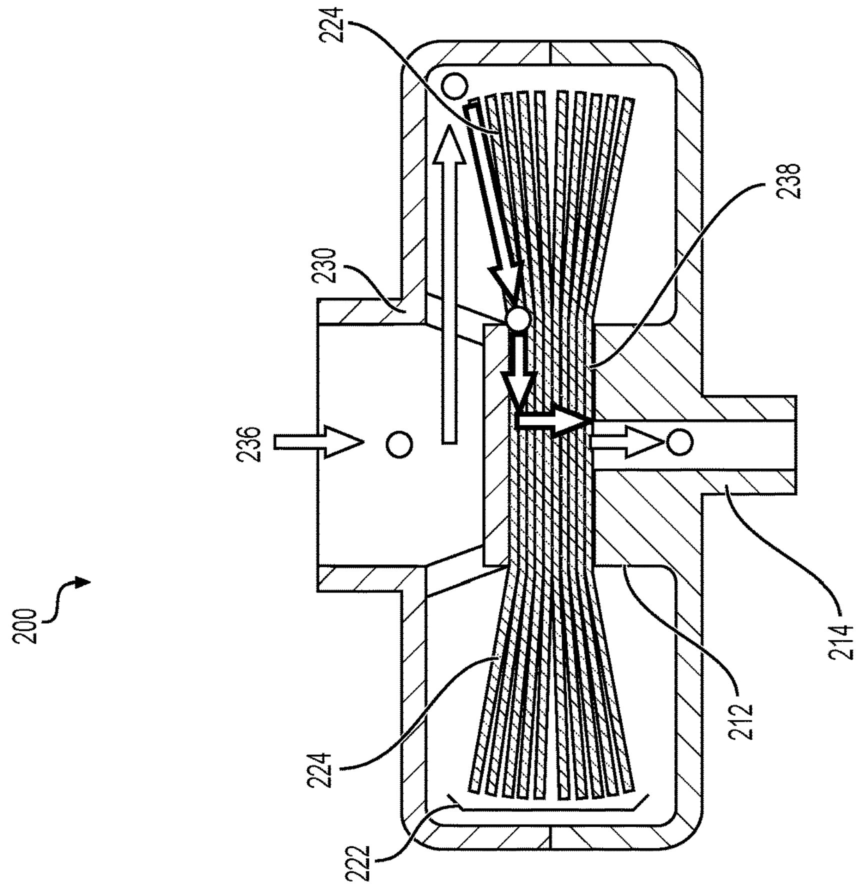
FIGS. 2A and 2B illustrate cross-sectional views of two exemplary fluid flow paths through a filtration system, according to variations herein.
Figure 2A:
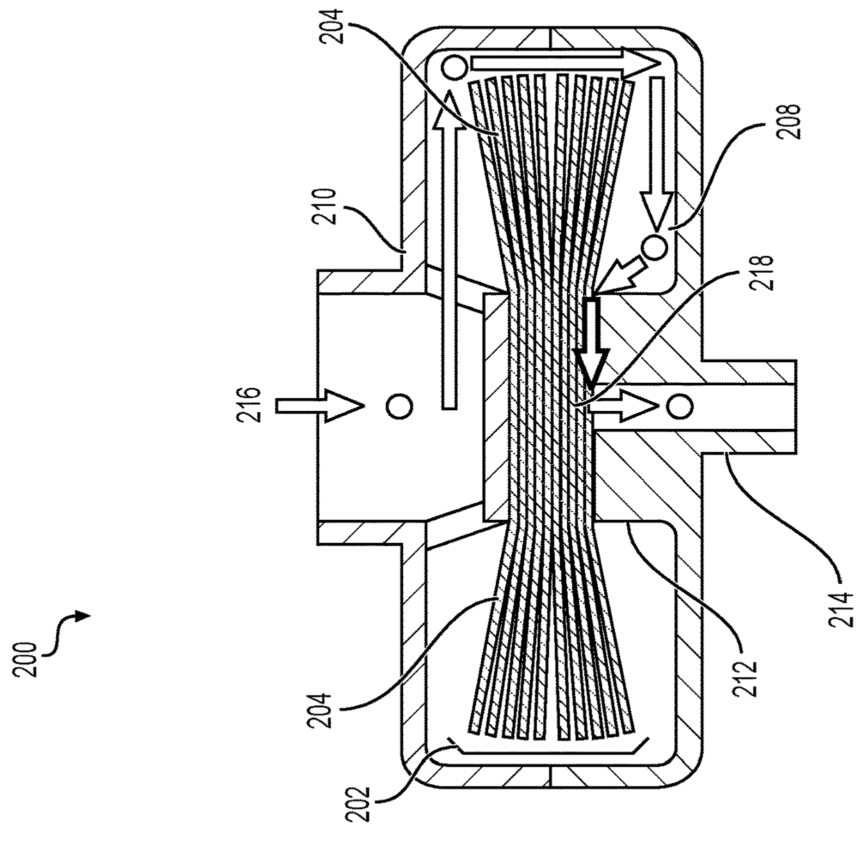

FIG. 2A shows a minimum distance, fluid path 216, that a fluid may travel through filtration system 200 to exit the system. While most fluid may enter the filter 202 at a random point within the uncompressed portions 204 of the filter, some fluid may flow around all of the membranes, to the bottom of the chamber 208 of filtration housing 210 and enter the filter 202 at a vertex between housing base 212 and the filter 202. Thus, fluid taking fluid path 216 may result in a lowest level of volumetric filtration. A distance of the fluid path 216 may be defined as a radius of central compressed portion 218 of the filter minus a radius of the fluid outlet 214.

Oppositely, FIG. 2B shows a maximum efficient distance, fluid path 236, that a fluid may travel through filtration system 220 to exit the system. In this scenario, a fluid may begin at an edge of a topmost membrane of uncompressed portion 224 of filter 222, flow transversely through the filter toward central compressed portion 238 and may travel distally through a remainder of the filter 222 before exiting through the fluid outlet 234 of base 232 of housing 230. Thus, a distance of the fluid path 236 may be defined as a radius of the filter 222 minus a radius of the fluid outlet 234, plus a total height (or thickness) of the compressed portion 238 of the filter 222.

The systems described herein may generally include a filtration device, such as a housing, for receiving and compressing at least a portion of a filter therein. In some variations, a filtration system may be configured for microfiltration, such as microfiltration of a fluid sample from a food processing lab, the sample having (or suspected to have) a microbe. FIG. 1 depicts an exemplary filtration system, filtration system 100, including housing 102. The housing 102 may include a first portion 104, which may be a top or proximal portion of the housing 102, and a second portion 106, which may be a base or distal portion of the housing 102. The first and second portions 104, 106 may be configured to couple together such that a filter (not shown) is maintained between them. The housing 102 may be configured to control an effective pore size and/or an effective surface area of the filter by applying and/or adjusting compression to the filter via the first and second housing portions 104, 106. Further, in some variations, a filtration system may include one or more components couplable to the housing 102. For example, as shown in FIG. 1, a proximal end of the housing 102 is directly coupled to enclosure 108 having seal 111, and a distal end of the housing 102 is indirectly coupled, via connector 114, to outlet extension 110. As described in further detail herein, components such as the enclosure 108 and outlet extension 110 may expedite an overall fluid filtration process and/or increase a volume of resulting filtrate when coupled with the housing 102.

Methods of using the filtration systems herein may include placing a filter within a filtration housing and flowing a fluid through the system. Optionally, the methods may include adjusting a compression of the filter within the housing. Methods of manufacturing the filtration systems herein may include aligning portions of a filtration housing (e.g., the first and second portions 104, 106 in FIG. 1), arranging a filter between the aligned portions, and coupling the aligned portions together.

Systems and Devices

The filtration systems described herein may generally include a filtration housing for receiving and adjusting one or both of an effective pore size and an effective surface area of a filter. The filtration system may be configured for single or multi-use microfiltration of one or more fluids. For example, a single housing may receive one or more filters for filtering one or more fluids having a liquid portion. The one or more fluids may include or be suspected to include a particle, such as a microbe and/or a food particle, and may be referred to interchangeably as a test sample. Accordingly, the filtrations systems described herein may enable a user to collect a retentate (e.g., the microbe and/or the food particle) and/or a filtrate (e.g., the filtered liquid portion) for one or more of concentration, analysis, storing, and the like. The housing may optimize fluid filtration by controlling an effective pore size (e.g., a minimum pore size, an average pore size, a range of pore sizes) and/or an effective surface area of the filter by at least partially compressing the filter therein. For example, the housing may control an effective pore size across a length of each membrane within a filter set having a plurality of membranes, resulting in a gradient of pore sizes across the length of the filter. Thus, the systems described herein may be configured to separate particles of various sizes from one or more fluids passed through the filter. Similarly, compressing the filter within the housing may control an effective surface area across a length of each membrane within a filter set having a plurality of membranes, resulting in an increased surface area of the filter set through which a sample fluid may be absorbed and filtered. Thus, the systems described herein may be configured to adjustably increase the effective surface area of the filter without increasing a thickness of the filter or using pleated filters.

Figure 3:
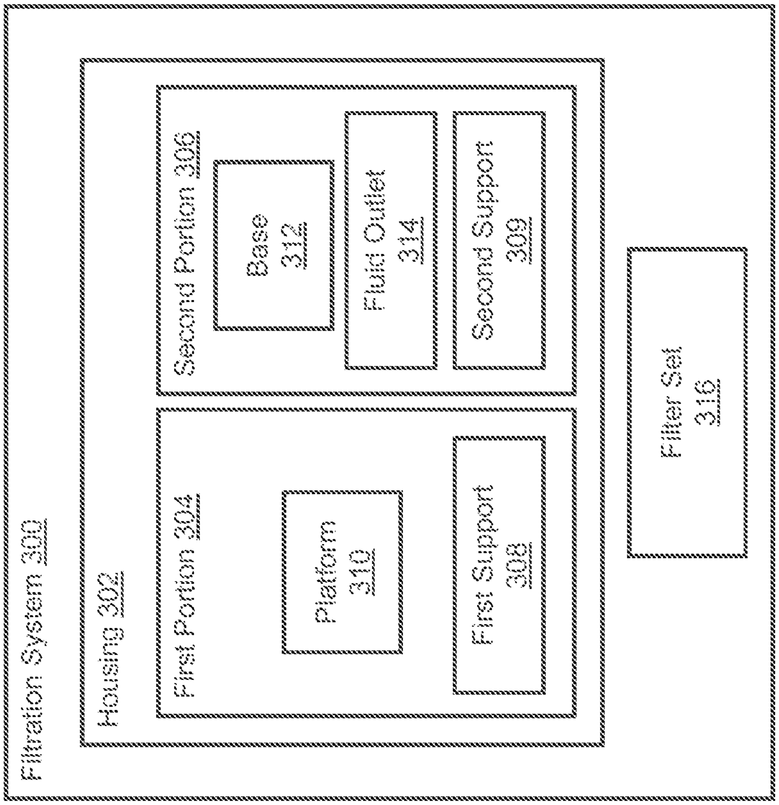
FIG. 3 is a schematic of a filtration system, according to variations herein.
Figure 5:
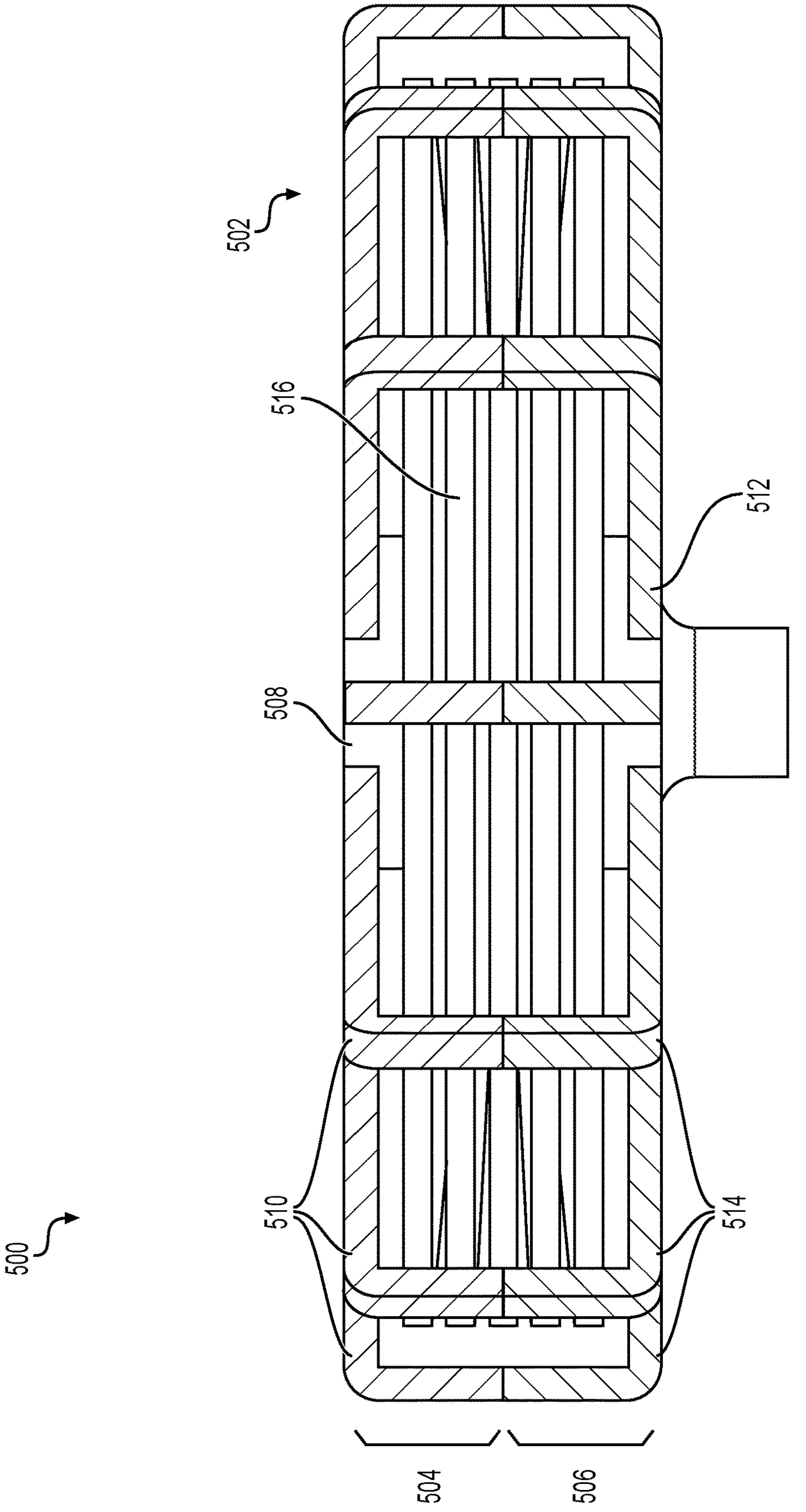
FIG. 5 depicts a frontal view of a filtration system, according to variations herein.
Figure 6B:
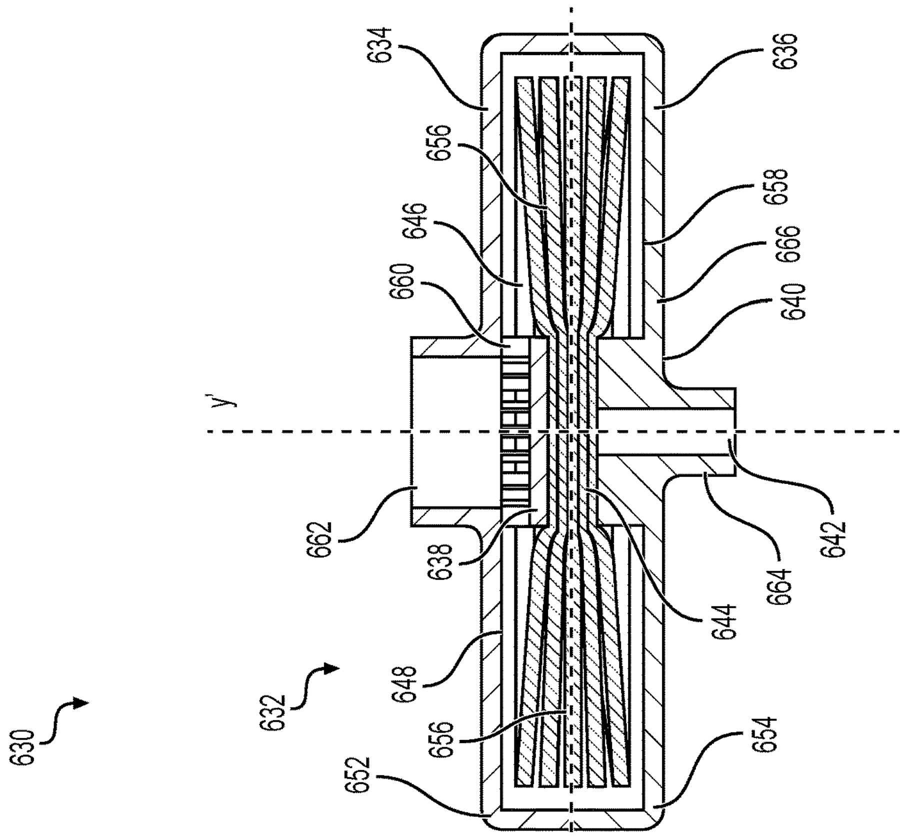
FIGS. 6A and 6B depict cross-sectional frontal views of two filtration systems, according to variations herein.
Figure 6A:
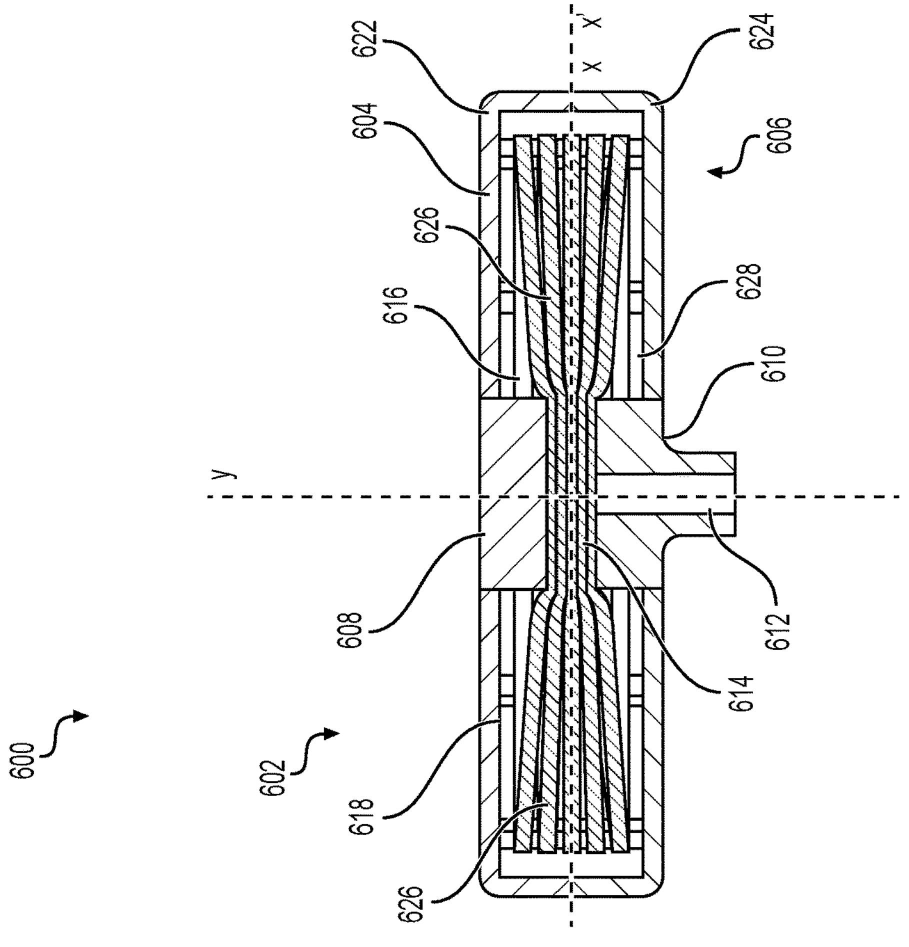
Figure 9:
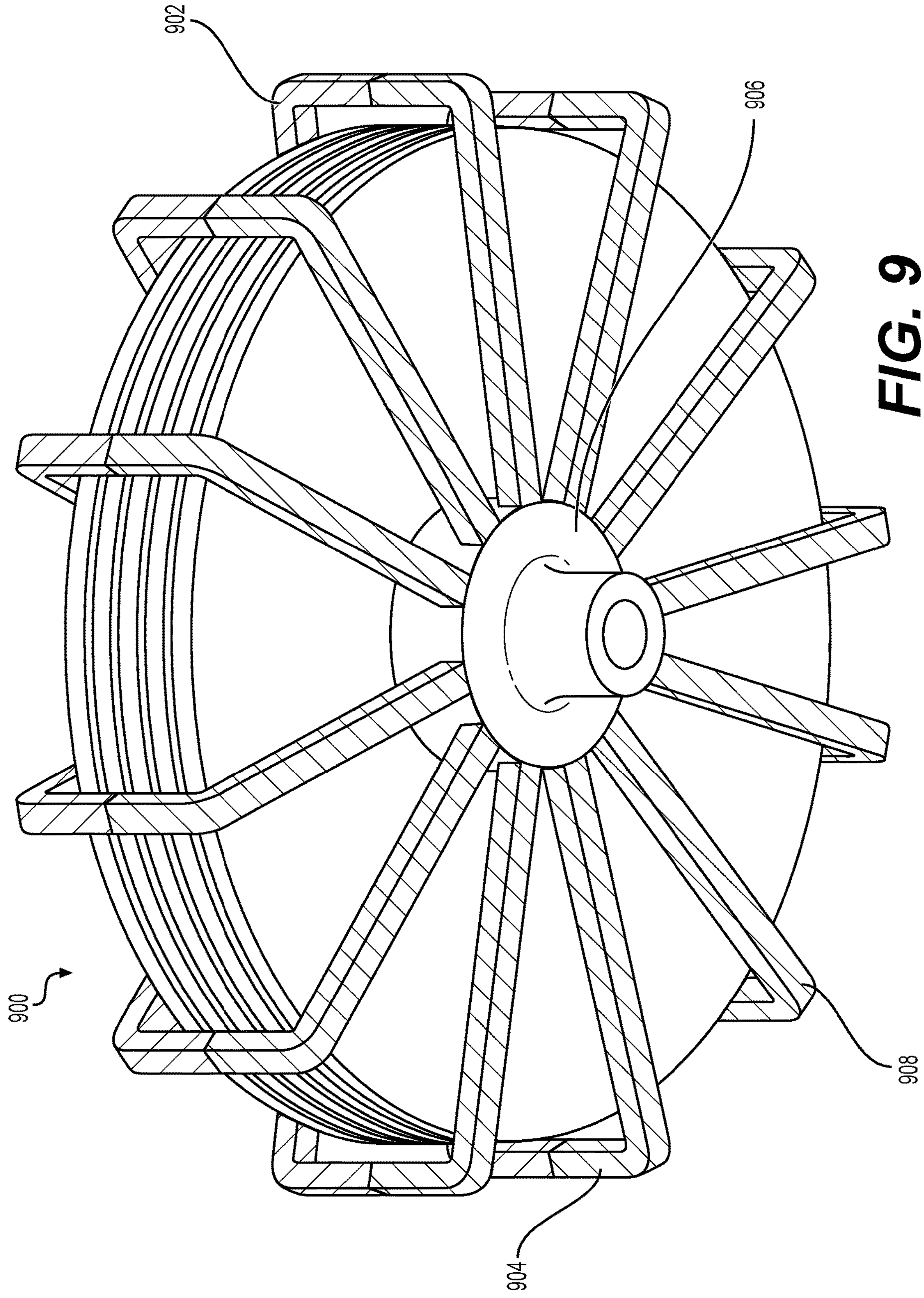
FIG. 9 depicts a base view of a filtration system, according to variations herein.

FIG. 3 shows a conceptual diagram of the filtration systems described herein (e.g., system 500 of FIG. 5, systems 600, 630 of FIGS. 6A-6B, and system 900 of FIG. 9). Filtration system 300, which includes housing 302 and filter 316. The housing 302 includes first portion 304 ("top portion", "proximal portion"), which may be couplable to a second portion 306 ("base portion", "distal portion"). The filter set 316 ("filter") may be configured to be arranged within the housing 302 prior to and/or following a coupling of the first and second portions 304, 306. When the first and second portions 304, 306 are coupled, the housing 302 may be a unitary structure. Additionally, the housing 302 may be configured to compress at least a portion of the filter set 316 between the first and second portions 304, 306. Accordingly, the housing 302 may be configured to control an effective pore size and an effective surface area of the filter set 316. The housing 302 may be configured to adjustably apply a compression to the filter. For instance, when compared to an uncompressed state of the filter, the housing 302 may be configured to apply between about 1% and about 80% compression to the filter, such as between about 5% and about 70%, between about 10% and about 60%, between about 15% and about 50%, or between about 20% and about 40% compression to the filter.

Figure 7:
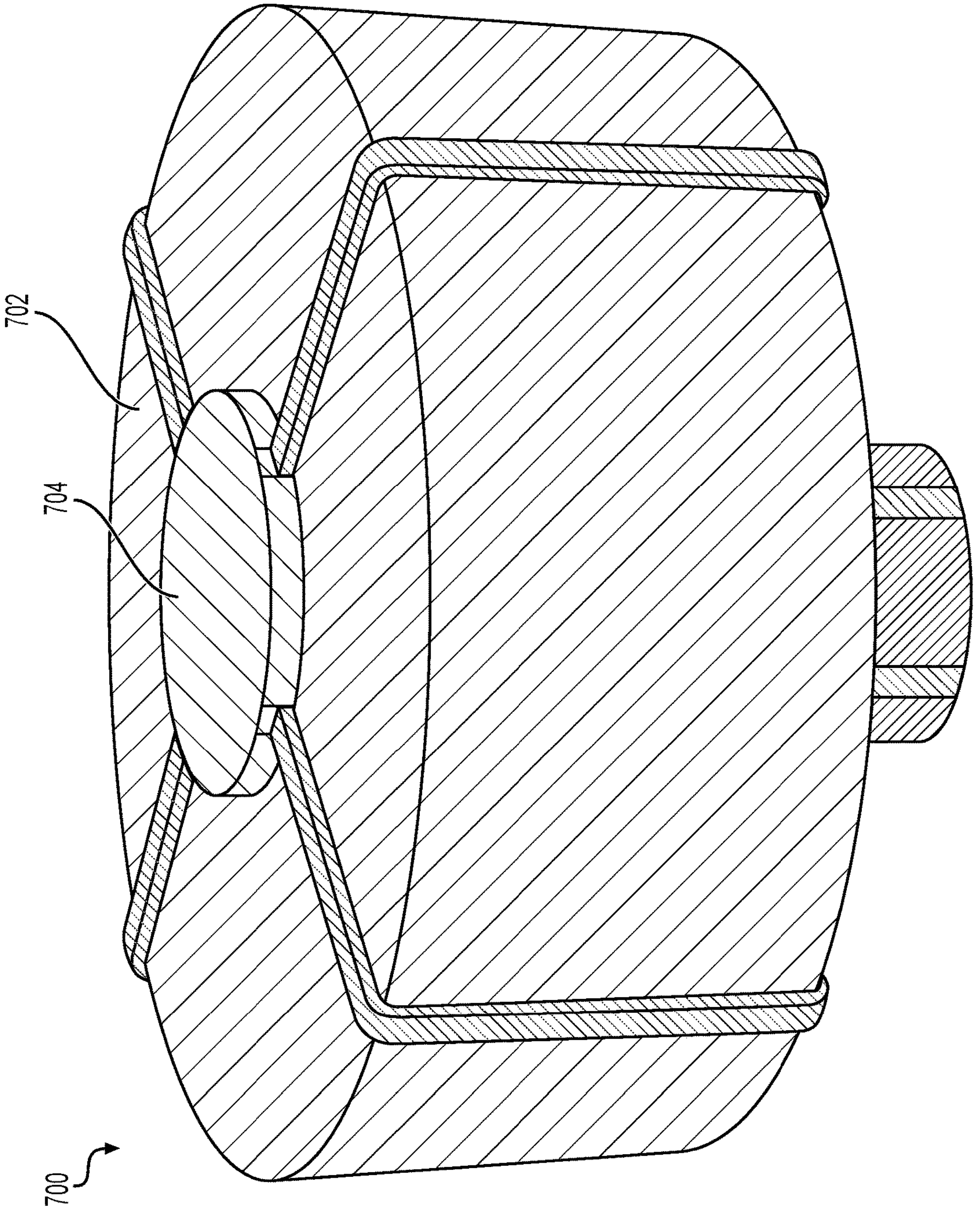
FIG. 7 depicts a perspective view of a filtration system, according to variations herein.

The first portion 304 generally includes platform 310 and first support 308 ("first extension", "second support structure"), which may extend from the platform 310. As described below with reference to FIG. 6B, in some variations, the first portion 304 may include a fluid inlet for receiving a fluid sample. As also described with reference to FIG. 6B, in some variations, the platform 310 may be a stage that is coupled to the first portion 304 via struts (e.g., stage 638 and struts 660). In such variations, the struts may allow fluid to flow into a housing configured to enclose the filter set 316 (e.g., via fluid inlet 662 into housing 632) while maintaining compression of the filter set 316 via the stage and the base 312. As described below with reference to FIGS. 6A-7, in some variations, the platform 310 may be distally offset from an interior surface of the housing 302 (e.g., platform 608 in FIG. 6A) and/or proximally offset from an exterior surface of the housing (e.g., platform 704 in FIG. 7). Further, as described below with reference to FIG. 8, in some variations, the platform 310 may include a rod or strut (e.g., strut 804) extending distally therefrom that is configured to pierce (or be received by) the filter set 316 and further extend through second portion 312 (e.g., through fluid outlet 314). The rod or strut may be used to stabilize the filtration system 300 and/or apply adjustable compression to the filter set 316. For example, the rod or strut may be part of a ratcheting mechanism for adjustably translating the platform 310 with respect to the base 312, thereby adjusting a distance between them and/or a compression of the filter set 316 therebetween.

The second portion 306 generally includes base 312, fluid outlet 314, which may extend through the base 312, and second support 309 ("second extension", "second support structure"), which may extend from the base 312. As described in further detail with respect to FIG. 6B, in some variations, the base 312 may extend proximally from an interior surface of the housing 302 (e.g., base 640). As also described below with respect to FIG. 6B, in some variations fluid outlet 314 may include an exterior portion coupled to and extending from the base 312 (e.g., exterior outlet portion 664 extending from exterior base surface 666).

The first and second portions 304, 306 may be couplable via the first and second supports 308, 309. In some variations, the first and second supports may be configured to align and couple along an interface of the first and second portions. Coupling of the first and second portions may apply and/or adjust a compression, and therefore an effective pore size and effective surface area, of the filter set within the housing.

To this end, the first and second supports 308, 309 may include a coupling mechanism for the first and second portions 304, 306. For example, complementary ends of the first and second supports 308, 309 may be couplable and provide a temporary or permanent coupling of the first and second portions 304, 306. In some variations, the coupling may be adjustable to achieve a percent compression as described above. For example, the first and second supports 308, 309 may be rotationally (e.g., via threads) or translatably (e.g., via press fit) coupled such that a distance between the platform 310 and the base 312 (i.e., the structures that are applying the compression to the filter) is adjustable. The distance may be reduced by between about 0 mm and about 10 mm, such as between about 1 and about 9 mm, between about 2 mm and about 8 mm, between about 3 mm and about 7 mm, or between about 4 mm and about 6 mm. Similarly, the distance may be reduced by a percentage of a thickness of a wholly uncompressed filter set. The distance may be reduced by between about 0% and about 50%, between about 1% and about 40%, between about 2% and about 30%, between about 3% and about 20%, or between about 4% and about 10%.

Further, the first and second supports 308, 309 may extend between the first and second portions 304, 306 to create an opening where the filter 316 may be arranged. That is, the first and second supports 308, 309 may form the walls of three-dimensional housing 302 having a chamber therein. In general, a housing chamber may have a volume configured to house the filter 216. To create such a chamber, the first support 308 may have a horizontal length extending radially from the platform 310 and a sequential vertical length extending distally along a longitudinal axis of the housing, and the second support 309 may have a complementary horizontal length extending radially from the base 312 and a complementary vertical length extending proximally along a longitudinal axis of the housing. The horizontal lengths of the first and second supports 308, 309 may be parallel and the vertical lengths of the first and second supports 308, 309 may be configured to be aligned relative to each other so that the ends of the vertical lengths of the first and second supports 308, 309 may be coupled together.

Filtration devices and components of filtration systems are described in further detail below. Although specific variations may be described (e.g., with reference to FIGS. 3-10), it should be understood that suitable alternative embodiments of the filtrations systems and devices may result from an exclusion and/or a combination of elements from one or more exemplary filtration systems or devices described herein.

Housing

A filtration housing may be configured to encompass a filter either partially or fully. The housing may also be configured to compress at least a portion of a filter therein. For example, the housing may partially encompass the filter such that a central portion of the filter is compressed, and a peripheral portion of the filter is uncompressed. Further, the housing may be configured to maintain, and in some variations, adjust, the compression of the filter during fluid filtration. As such, the housing may be constructed of one or more suitable materials configured for holding and compressing the filter therein, such as a metal, polymer, or hybrid material. For example, the housing may be made of a semi-rigid plastic material configured to bend and at least partially conform to a shape of the filter.

Figure 4:
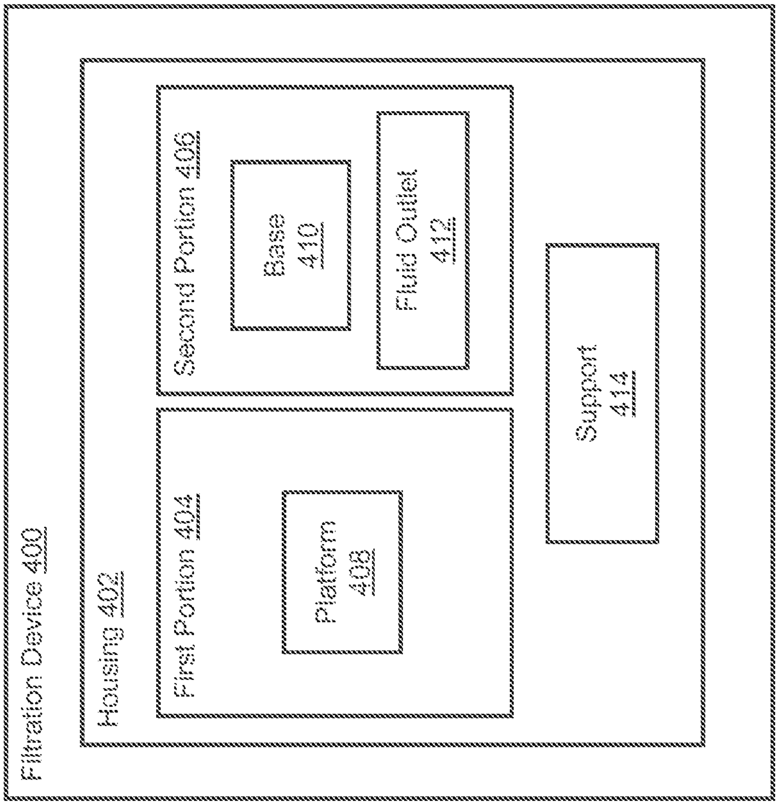
FIG. 4 is a schematic of a filtration device, according to variations herein.

The housing may be used in a system with a filter (e.g., filtration system 300), or may be a discrete filtration device. For example, FIG. 4 is a conceptual diagram of filtration device 400. Such a device may correspond to any one of housing 102 of FIG. 1, housings 210, 230 of FIGS. 2A-2B, housing 302 of FIG. 3, housing 502 of FIG. 5, housings 602, 632 of FIGS. 6A-6B, housing 702 of FIG. 7, housing 802 of FIG. 8, housing 902 of FIG. 9, and housing 1002 of FIG. 10.

Referring to FIG. 4, filtration device 400 includes first portion 404, second portion 406, and support 414. The first and second portions 404, 406 may be releasably or permanently couplable according to methods described in further detail herein. The first portion 404 generally includes platform 408, which may be distally offset from the first portion 404 (e.g., from an interior surface of the first portion). The second portion 406 generally includes base 410 and fluid outlet 412, which may be a conduit extending through the base 410. The base may be proximally offset from the second portion 406 (e.g., from an interior surface of the second portion). In some variations, the support 414 may include a first support and a second support (e.g., first and second supports 308, 309 of FIG. 3). In some variations, the support 414 may be a single support having a first end coupled to the first portion 404 (e.g., to a proximal portion of the platform) and a second end configured to releasably or permanently couple to the second portion 406 (e.g., to a distal portion of the base), where the support 414 extends distally along a longitudinal axis from the first portion 404 to the second portion 406. Oppositely, in some variations, the support 414 may be a single support having a first end coupled to the second portion 406 (e.g., to a distal portion of the base) and a second end configured to releasably or permanently couple to the second portion 406 (e.g., to a proximal portion of the platform), where the support 414 extends proximally along a longitudinal axis from the second portion 404 to the first portion 406.

Either as a discrete filtration device or within a system including a filter, the filtration housing may define longitudinal ("vertical") and lateral axes ("horizontal", "transverse"). For example, as shown in FIGS. 6A and 6B, housings 600, 630 may define central longitudinal axes x and x', and central lateral axes y and y'. Referring to FIG. 6A as an example, housing 602 of filtration system 600 defines central longitudinal axis, y, along which platform 608, base 610, fluid outlet 612, and compressed filter portion 614 are aligned. The central longitudinal axis may be defined as an axis that is equidistant from interior and/or exterior surfaces of opposing sidewall portions of the housing 602 and/or from opposing sidewall portions of the filter 616. The housing 602 also defines the central lateral axis, x, along which a center of the housing 602 and a center of filter set 616 are aligned. The central lateral axis may be defined as an axis that is equidistant from an exterior and/or an interior surface of the platform 608 of first portion 604 and an exterior and/or interior surface of the base 610 of second portion 606. In some variations, the central lateral axis may be an interface at which the first and second portions 622, 624 are configured to couple. In some variations, the central lateral axis x may be symmetrical about a central longitudinal axis and may include a three-dimensional shape, such as a cylinder, a cube, a rectangular prism, etc. For example, the housing may include a cylindrical or substantially cylindrical shape. Several elements of the housing, such as the platform, the base, and the fluid outlet, may be centrally aligned. Thus, the housing may be considered to have a "central portion" and a "peripheral portion". These portions may be configured to align with corresponding central and peripheral portions of the filter. Further, elements of the housing, such as the platform and the base, may have identical or substantially identical characteristics (e.g., height, width or diameter, shape, surface characteristics, etc.) to facilitate symmetrical alignment of the housing about the filter.

First and second supports of first and second housing portions may make up two halves of an overall housing support structure. In some variations, the housing may be a structure configured to enclose the filter set (e.g., a housing 102 of FIG. 1), such as a cartridge. Such a structure may have continuous top, base, and or/sidewall portions, and may also include a fluid inlet and fluid outlet for guiding fluid through the filtration system. In alternate variations, a filtration housing may be a structure configured to encompass, but not enclose, a filter set, such as a cage. A cage housing structure may have one or more top, base, and/or sidewall apertures configured to receive fluid therebetween. In some variations, the cage housing may expose the filter therein such that an exterior of the filter may receive fluid from 360 degrees (about the housing). FIG. 5 shows a front view of an example variation of a filtration system, filtration system 500, including housing 502 having a substantially cylindrical cage structure which internally receives filter set 516. The housing 502 is formed by the coupled top portion 504 and base portion 506. Specifically, the top portion 504 includes platform 508 and top legs 510 extending therefrom, and the base portion 506 includes base 512 and base legs 514 extending therefrom. The top and bottom legs 510, 514, are aligned with respect to each other, and coupled along a central lateral axis of the housing 502. This coupling is an indirect coupling of the platform 508 and base 512, each of which protrude internally to hold filter set 516 therebetween.

When the filter is arranged within the housing, the cage housing structure may expose at least a portion of the filter through the apertures, such as between about 10% and about 50% of the filter (e.g., between about 20% and about 40% of the filter, or about 30% of the filter). In some variations, the cage housing structure may expose a majority of the filter through the apertures (e.g., housings 702, 802 of FIGS. 7 and 8). For example, the cage housing structure may expose between about 50% and about 90% of the filter (e.g., between about 60% and about 80% of the filter, or about 70% of the filter).

Generally, the housing may have dimensions configured to facilitate arrangement of the filter therein. In particular, the housing may have inner dimensions, such as an inner height and an inner width or diameter, that are about equal to or greater than corresponding dimensions of the filter, such as a thickness and width or diameter of the filter. The inner height of the housing may be defined as a distance between an interior top surface of the first portion and an interior base surface of the second portion, and may be between about 0.1 cm and about 50 cm, such as between about 0.2 cm and about 30 cm, between about 0.3 cm and about 25 cm, between about 0.4 cm and about 20 cm, between about 0.5 cm and about 15 cm, or between about 0.6 cm and about 10 cm. The inner height of the housing may be variable along a lateral axis of the housing in variations where an interior surface of one or both of the first and second portions is irregular (e.g., if one or both of the first and second portions include internal protrusions such as a platform and/or a fluid outlet). The inner width or diameter of the housing may be defined as a distance between a first interior sidewall of the housing and a second, opposite interior sidewall of the housing, and may be between about 5 mm and about 100 mm, such as between about 10 mm and about 90 mm, between about 15 mm and about 80 mm, or between about 20 mm and about 70 mm. In some variations, the inner width or diameter of the housing may be greater than a width or diameter of the filter. Generally, the inner width or diameter of the first portion may be equal to the inner width or diameter of the second portion such that, when coupled, the unitary housing structure has a constant inner width or diameter along a longitudinal axis of the housing.

Oppositely, an outer height of the housing may be defined as a distance between an exterior top surface of the first portion and an exterior base surface of the second portion 204, and may be between about 0.2 cm and about 50 cm, such as between about 0.3 cm and about 30 cm, between about 0.4 cm and about 25 cm, between about 0.5 cm and about 20 cm, between about 0.6 cm and about 15 cm, or between about 0.7 cm and about 10 cm. Like the inner height of the housing, the outer height of the housing may be variable along a lateral axis of the housing in variations where an exterior surface of one or both of the first and second portions is irregular (e.g., if one or both of the first and second portions include external protrusions such as a fluid inlet and/or a fluid outlet). An outer width or diameter of the housing 202 may be defined as a distance between a first exterior sidewall of the housing and a second, opposite exterior sidewall of the housing, and may be between about 7 mm and about 102 mm, such as between about 12 mm and about 92 mm, between about 17 mm and about 82 mm, or between about 22 mm and about 72 mm. Generally, the outer width or diameter of the first portion 204 may be equal to the outer width or diameter of the second portion such that, when coupled, the unitary housing structure has a constant outer width or diameter along a longitudinal axis of the housing 202. Further, the housing may have a thickness defined by a length between exterior and interior surfaces of the housing. The thickness may be between about 0.1 mm and about 5 mm, such as between about 0.2 mm and about 4 mm, between about 0.3 mm and about 3 mm, or between about 0.4 mm and about 2 mm. The thickness may be constant or substantially constant throughout. The thickness may be constant or substantially constant throughout.

First Portion

A first portion of a filtration housing may be proximal to a second portion of the housing along a longitudinal axis of the housing. Accordingly, the first portion may be referred to herein as a "top" or a "proximal" portion.

The first portion may be configured to contact the filter via platform (or stage). For example, the platform may be a central platform of the first portion configured to contact a central portion of a proximal surface of the filter. FIGS. 6A and 6B depict cross-sectional views of exemplary filtration systems 600, 630 having a top housing portion with a central platform configured to contact a portion of a filter set, where the platform is offset from an interior top surface of the top portion. Referring first to FIG. 6A, top portion 604 of housing 602 includes centrally located platform 608. The platform 608 is a solid portion that is directly coupled to and protrudes distally from interior top surface 618. A width or diameter of the platform may be between about 2 mm and about 60 mm, such as, for example, between about 3 mm and about 50 mm, between about 4 mm and about 40 mm, or between about 5 mm and about 30 mm. Generally, a wider platform width or diameter may, when paired with a complementary base width or diameter, yield a larger compressed portion of the filter. The platform 608 may be offset from the interior top surface 618 (to the distal end of the platform) by between about 0 mm and about 30 mm, such as, for example, between about 0.1 mm and about 25 mm, between about 0.2 mm and about 20 mm, or between about 0.3 mm and about 15 mm. As shown, the distal end of the platform 608 is configured to contact and at least partially compress the filter 616. Moreover, the distal end of the platform 608 may be a variable distance from the interior top surface 618. For example, the distal end of the platform 608 may be sloped or ramped, may be curved, or may have an irregular geometry. As described in further detail below, a platform having a distal end of variable geometry may provide variable compression to a filter as compared to a platform having a constant geometry.

In FIG. 6B, top portion 634 of housing 632 is coupled to centrally located stage 638. The stage 638 is a solid portion that is indirectly coupled to interior top surface 648 via struts 660. The struts 660 are directly coupled to and extend distally from the interior top surface 648. The top portion 634 also includes fluid inlet 662. As such, indirect coupling of the stage 638 to the interior top surface 648 via the struts 660 allows fluid to enter the housing 632 via the inlet 662. The stage 638 may be offset from the interior top surface 648 by between about 0 mm and about 30 mm, such as, for example, between about 0.1 mm and about 25 mm, between about 0.2 mm and about 20 mm, or between about 0.3 mm and about 15 mm. That is, a distance between the interior top surface 648 and a distal end of the stage may be between about 0.1 cm and about 10 cm. As shown, the distal end is configured to contact and at least partially compress the filter 646. Moreover, the distal end of the stage may be a variable distance from the interior top surface 648, thereby providing different compression to the filter 646 as compared to a stage having a distal end of a constant distance from an interior top surface 648.

While the struts 660 are shown in FIG. 6B to be perpendicular to the interior top surface 648, in some variations, the struts may be angled relative to the interior top 648. Additionally, or alternatively, the struts may be adjustable in length for adjusting a distance at which the stage 638 is offset from the interior top surface 648. Thus, the stage 648 may be offset from the interior top surface 438 by an adjustable distance. The struts 660 may include any suitable number of struts such as 1, 2, 3, 4, 5, 6, 7, 8, 9, 10, or more than 10 struts. For example, the struts 660 may include at least one strut. As another example, the struts may include at least two struts. In some variations, the struts 660 may include a plurality of struts that extend from the interior top surface 648 adjacent, or directly underneath, a perimeter of the fluid inlet 662. The struts 660 may include one or both of a flexible and a rigid material.

Similarly, in some variations, a platform or stage of the first portion may be releasably coupled to the interior surface of the top portion (e.g., press-fit, snap-fit, magnets, fasteners, a rotational coupling, an adhesive, welding, etc.).

A width or diameter of the fluid inlet (e.g., an inner width or diameter of the conduit of the inlet, such as inlet 662 in FIG. 6B) may be about equal to, less than, or greater than a width or diameter of the stage (e.g., stage 638 in FIG. 6B). For example, a width or diameter of the fluid inlet may be between about 0.1 mm and about 80 mm, such as between about 0.5 mm and about 70 mm, between about 1 mm and about 60 mm, or between about 1.5 mm and about 50 mm. Similarly, a cross sectional area of the stage may be about equal to, less than, or greater than a cross sectional area of the fluid inlet. Additionally, a volume of the stage may be about equal to, less than, or greater than a volume of the fluid inlet.

Figure 10:
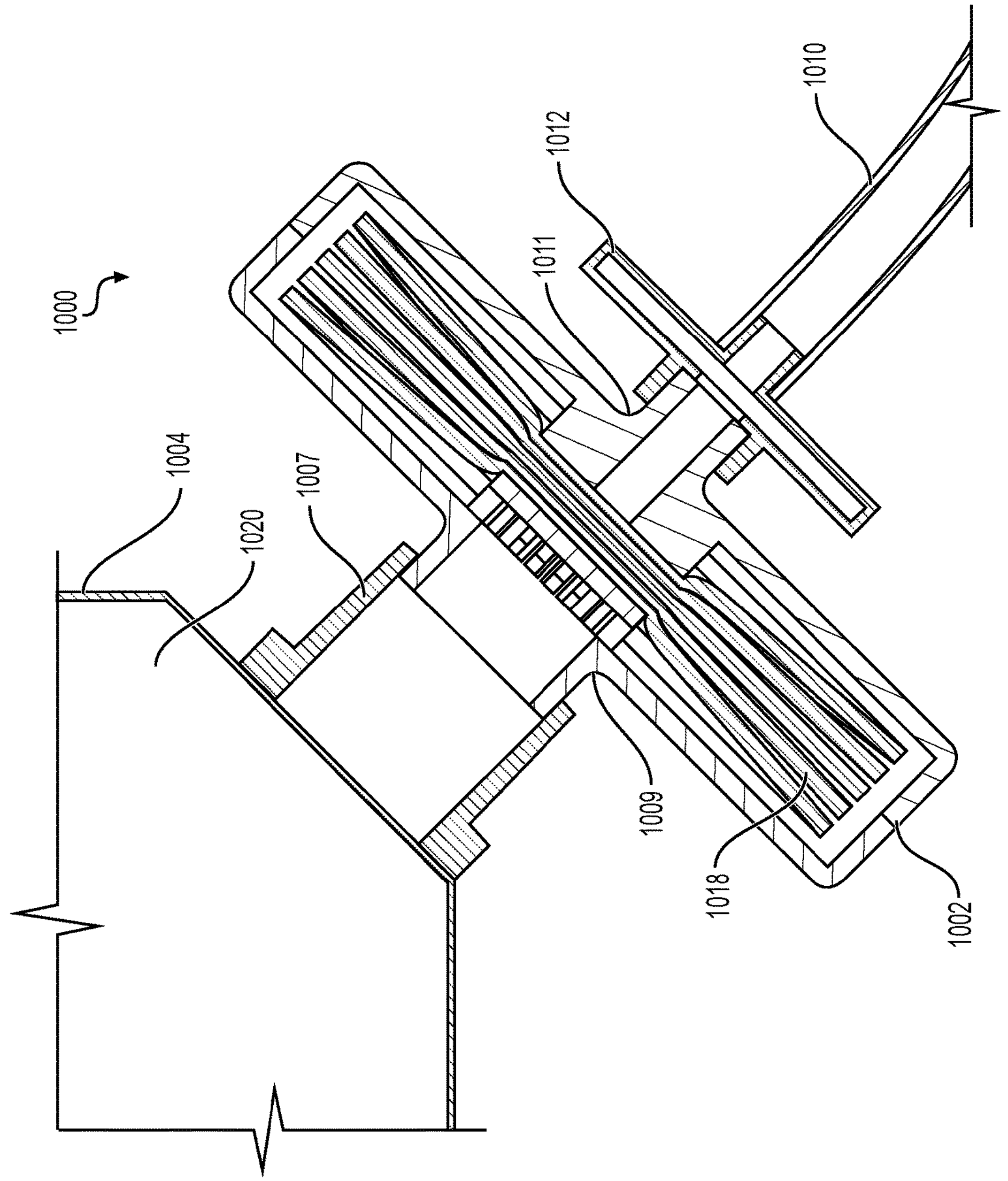
FIG. 10 depicts a cross-sectional view of a filtration system, according to variations herein.

In some variations, the width or diameter of the fluid inlet may configure the filtration housing to couple to a separate component of the filtration system via the fluid outlet (e.g., at or adjacent to a proximal end of the exterior portion of the fluid inlet). For example, as shown in FIG. 10, fluid outlet 1009 may be releasably couplable to connector enclosure outlet 1007 to guide a filtrate into housing 1002.

Although the platforms and stages described herein are generally shown to have rectangular cross-sectional shapes (e.g., platform 608 in FIG. 6A, stage 638 in FIG. 6B), the platforms and stages may include any suitable shape or cross-sectional shape (e.g., square, circular, ovular, cylindrical, triangular, pentagonal, hexagonal, irregular, etc.).

In some variations, a platform of the first portion housing may not be distally offset from the top portion. Additionally, or alternatively, in some variations, the platform may protrude from a proximal exterior surface of the top portion. For example, in filtration system 700 of FIG. 7, platform 704 extends only proximally from an interior top surface (not shown) of housing 702.

In variations where the first portion includes a fluid inlet, the filtration housing may be configured to couple to separate components of the filtration system via the fluid inlet.

For example, as shown in FIG. 10, the fluid inlet 1009 may be releasably couplable to enclosure outlet 1007 to receive a fluid from enclosure 1004.

Further, in some variations, the platform may include a rod or strut configured to extend distally through one or more portions of the housing and aid in compression of the filter within the housing. The rod or strut may be flexible or inflexible. In some variations, the platform may include an aperture (e.g., a central conduit) configured to receive the rod or strut therethrough. For example, in some variations, the rod or strut may be a zip tie configured to extend through the platform, filter, and fluid outlet and around an exterior of the filter and/or the housing so that the two ends of the zip tie may be fastened. In other variations, the rod or strut may be a distal strut coupled to and extending from a distal surface of the platform. The distal strut may be configured to provide adjustable compression of a filter set that is in contact with and between the platform and a housing base. To accomplish this, the distal strut may be configured to pierce and extend through the filter set and base outlet such that a distal end of the distal strut may be accessed and adjustably translated to control a distance between the platform and the base. For example, system 800 of FIG. 8 includes strut 804 extending through base 806 within fluid outlet 808 of housing 802. The strut is coupled to the base via coupling mechanism 810. The strut 804 may be coupled to a distal end of a platform of the housing 802 (not shown). Translation of such a strut along a longitudinal axis of a filtration housing may correspondingly translate the platform such that a distance between the platform and the base is adjusted. For example, distal translation of the distal strut may correspondingly pull the platform closer to the base such that the distance between the two is decreased. In some variations, the filter set may include a central conduit configured to receive the distal strut. In such variations, an outer dimension (i.e., a width or diameter) of the distal strut may be about equal to an inner dimension (i.e., a width or diameter) of the conduit to prevent a gap from forming between the strut and the conduit. Such relative dimensions may force a fluid flowing through the filter set to flow through at least a portion of the filter set prior to exiting through a base fluid outlet. As described in further detail herein, the distal end of the distal strut may be actuated by a user directly and may be temporarily or permanently locked to maintain a desired compression of the filter set by maintaining the distance between the platform and the base.

The first portion of the housing of a filtration system may include a first support ("extension", "support structure") defining a first half of an overall housing support structure (e.g., a cage or a cartridge). Generally, the first support may couple to and extend from a central region of the first portion. The first support may include one or both of a lateral portion, which extends for a length along a lateral axis of the housing, and a vertical portion, which extends for a length along a longitudinal axis of the housing. The length of the lateral portion may be between about 2 mm and about 50 mm, and the length of the vertical portion may be between about 1 mm and about 50 mm. In some variations, the length of the lateral portion may be greater than the length of the vertical portion. For example, the length of the lateral portion may be about 30 mm, and the length of the vertical portion may be about 10 mm. In some variations, the lateral portion may extend radially about the longitudinal axis of the housing. In some variations, the first support may couple to and extend from a central platform of the first portion. For example, in FIG. 6A, the first support 622 of the top portion 604 is coupled to and extends radially and distally from the platform 608. In other variations, the first support may couple to and extend from a central fluid inlet of the first portion. For example, in FIG. 6B, the first support 652 the top portion 634 is coupled to and extends radially and distally from the fluid inlet 662.

Second Portion

A second portion of a filtration housing may include a base, a fluid outlet extending therethrough, and a second support. The second portion may be distal to the first portion along a longitudinal axis of the housing. Accordingly, the second portion may be referred to herein as a "base" or a "distal" portion.

The second portion may be configured to contact the filter via a base portion. For example, the base may be configured to contact a central portion of a distal surface of the filter. In some variations, the base may be the sole portion of the second portion configured to contact the filter. For example, FIGS. 6A and 6B depict cross-sectional views of example variations of a filtration system 600, 630 having a base housing portion with a base configured to contact a portion of a filter set, where the base is offset from an interior base surface of the base portion. Referring to exemplary FIG. 6A, base portion 606 of housing 602 includes centrally located base 610 having fluid outlet 612 extending therethrough. The base 610 is directly coupled to and protrudes proximally from interior base surface 628. A width or diameter of the base may be between about 5 mm and about 100 mm, such as between about 10 mm and about 90 mm, between about 15 mm and about 80 mm, or between about 20 mm and about 70 mm. Generally, a wider base width or diameter may, when paired with a complementary platform width or diameter, yield a larger compressed portion of the filter. The base 610 may be offset from the interior base surface 628 (to a proximal end of the base 610) by between about 0 mm and about 30 mm, such as, for example, between about 0.1 mm and about 25 mm, between about 0.2 mm and about 20 mm, or between about 0.3 mm and about 15 mm. As shown, the proximal end of the base 610 is configured to contact and at least partially compress the filter 616. In some variations, a proximal end of the base 610 may be a variable distance from the interior base surface 628. For example, the proximal end of the base 610 may be sloped or ramped, may be curved, or may have an irregular geometry. As described in further detail below, a base having a proximal end of variable geometry may provide variable compression to a filter as compared to a platform having a constant geometry.

Similarly, FIG. 6B shows an enclosed variation of base portion 636 of housing 602. Like the base portion 606, the base portion 636 includes base 640 which protrudes from interior base surface 658 of the base portion 636. Additionally, fluid outlet 642 extends through base 640

The fluid outlet extending through the base may further extend past an exterior base surface of the base portion. As depicted in FIG. 6B, an exterior outlet portion 664 of the fluid outlet 642 protrudes distally from exterior base surface 666. The exterior outlet portion 664 may be offset from the exterior base surface 666 (to a distal end of the exterior outlet portion 664) by between about 0 mm and about 30 mm, such as, for example, between about 0.1 mm and about 25 mm, between about 0.2 mm and about 20 mm, or between about 0.3 mm and about 15 mm. Further, the exterior outlet portion 664 may have a thickness between about 0.01 mm and about 15 mm, such as between about 0.05 mm and about 5 mm, or between about 0.1 mm and about 1 mm. Accordingly, a dimension (e.g., a width or diameter) of the fluid outlet 642 may be less than an outer dimension (e.g., an outer width or diameter) of the exterior outlet portion 664.

For example, the width or diameter of the fluid outlet may be between about 0.1 mm and about 80 mm, such as between about 0.5 mm and about 70 mm, between about 1 mm and about 60 mm, or between about 1.5 mm and about 50 mm, and an outer width or diameter of the exterior outlet portion may be between about 0.6 mm and about 71 mm, between about 1.1 mm and about 61 mm, or between about 1.6 mm and about 51 mm.

Similarly, a width or diameter of the fluid outlet (e.g., an inner width or diameter of the conduit extending through the base) may generally be less than a width or diameter of the base. Additionally, a cross sectional area and/or a volume of the base may be greater than a cross sectional area and/or a volume of the fluid outlet.

The width or diameter of the fluid outlet may configure the filtration housing to couple to a separate component of the filtration system via the fluid outlet (e.g., at or adjacent to a distal end of the exterior portion of the fluid outlet). For example, as shown in FIG. 10, fluid outlet 1011 may be releasably couplable to connector 1012 guide a filtrate into outlet extension 1010.

Although the bases described herein are generally shown to be rectangular (e.g., base 610 in FIG. 6A), a base may be any suitable shape (e.g., square, circular, ovular, triangular, pentagonal, hexagonal, irregular, etc.).

Figure 8:
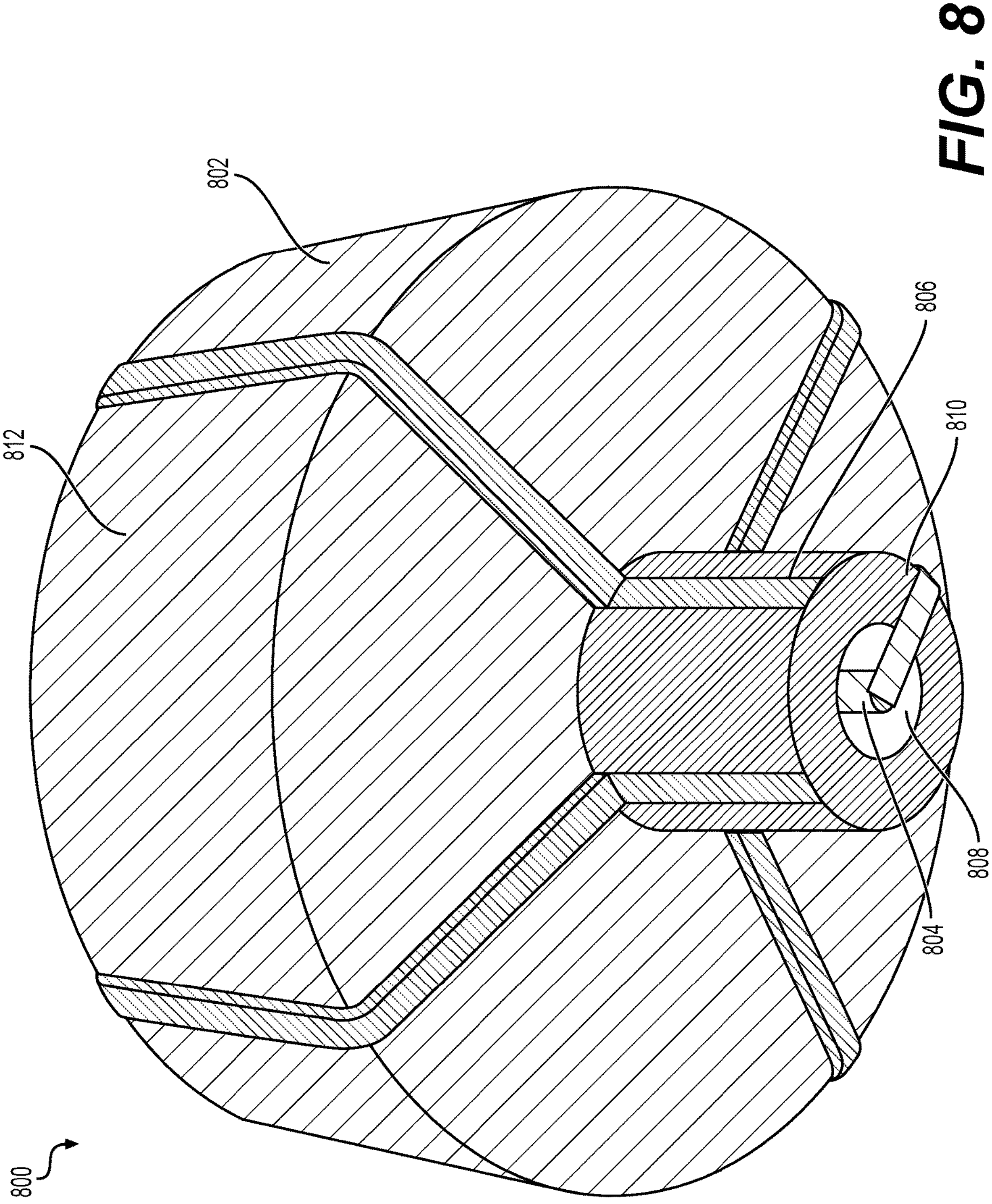
FIG. 8 depicts a base view of a filtration system, according to variations herein.

As described with respect to the first portion of the filtration housing, in some variations, the housing may include a strut coupled to the first portion and extending through the filter set and fluid outlet of the second portion. In such variations, the distal end of the strut may be couplable to the distal end of the base via a coupling mechanism. For example, FIG. 8 depicts a base view of such a system, system 800. As shown, coupling mechanism 810 may be coupled to a distal end of strut 804 at a first end and to a distal end of base 806 at a second end. The coupling mechanism 810 may provide adjustable coupling between the strut 804 and the base 806 in order to maintain a compression of filter set 812 within filtration housing 802. For example, the coupling mechanism 810 may be a ratchet configured to be actuated to longitudinally translate the strut 804 through fluid outlet 808 and subsequently lock the strut 804 in a desired position relative to the base 806.

The second portion of the housing of a filtration system may include a second support ("extension", "support structure") making up a second half of an overall housing support structure (e.g., a cage or a cartridge). Generally, the second support may couple to and extend from a central region of the first portion. For example, as shown in filtration system 900 of FIG. 9, second support 908 may couple to and extend from central base 906 of base portion 904 of housing 902 of portion. As depicted, second support 908 may extend radially and proximally from base 906.

The second portion of the housing of a filtration system may include a second support ("extension", "support structure") defining a second half of an overall housing support structure (e.g., a cage or a cartridge). Generally, the second support may couple to and extend from a central region of the second portion. The second support may include one or both of a lateral portion, which extends for a length along a lateral axis of the housing, and a vertical portion, which extends for a length along a longitudinal axis of the housing. The length of the lateral portion may be between about 2 mm and about 50 mm, and the length of the vertical portion may be between about 1 mm and about 50 mm. In some variations, the length of the lateral portion may be greater than the length of the vertical portion. For example, the length of the lateral portion may be about 3 cm, and the length of the vertical portion may be about 1 cm. In some variations, the lateral portion may extend radially about the longitudinal axis of the housing. In some variations, the first support may couple to and extend from a central base of the first portion. For example, in FIG. 6A, the first support 622 of the top portion 604 is coupled to and extends radially and distally from the platform 608. Similarly, in FIG. 6B, the second support 654 the base portion 636 is coupled to and extends radially and distally from the base 640.

Housing Coupling Mechanism

As noted above, in some variations, the filtration housing may be a single part (i.e., of single construction) configured to compress a filter therein. As also described above, in other variations, the filtration housing may include at least two portions configured to couple together. Referring again to FIG. 3, in some variations, the first and second portions 304, 306 may be adjustably or fixedly coupled via the supports 308, 309. For example, the first and second portions 304, 306 may be coupled via end(s) of the supports 308, 309 (e.g., distal ends of the supports 308 and complementary proximal ends of the supports 309). The first and second portions 304, 306 may be relatively aligned such that the complementary ends of the supports 308, 309 and/or a coupling mechanism of the supports 308, 309 or of the system 300 may algin and achieve a desired coupling orientation. For example, as depicted in FIGS. 6A and 6B, a desired coupling orientation may yield a central alignment (i.e., along the x, x' and y, y' axes) of the platform or stage 608, 638, the central compressed portion 614, 644, the base 610, 640, and the fluid outlet 612, 642.

Any suitable mechanism may be used to couple the first and second portions of the housing. Nonlimiting examples of coupling mechanisms include a press-fit, a snap-fit, complementary magnets within the first and second portions, fasteners configured to join the top and bottom portions together, a rotational coupling mechanism, one or more adhesives, and/or use of welding. For example, an adjustable rotational coupling may be used where an inner sidewall surface of the first portion includes threads and an outer sidewall surface of the second portion includes complementary threads. As another example, complementary ends of the respective supports of the top and bottom portions may be welded together. The welding may include one or more of friction welding, laser welding, solvent welding, thermal impulse welding, thermal impulse welding, solvent welding, and infrared welding. Friction welding, for example, may include one or more of friction stir welding, friction stir spot welding, linear friction welding, and ultrasonic welding.

The welding may occur before or after a filter set is arranged within the housing. As yet another example, an adjustable press-fit coupling may be used where a distal end of the support structure of the first portion includes a groove or ridge, and a complementary proximal end of the support structure of the second portion includes a complementary ridge or groove configured to receive or enter the groove or ridge of the first portion. Additionally, or alternatively, one or more components (e.g., fasteners, ratchet) may be introduced to the filtration system to couple or assist in coupling the housing portions. For example, a rod or strut (e.g., strut 804 in FIG. 8) may be a ratchet mechanism configured to extend through the first portion, filter, and second portion of a housing. The rod or strut may be adjustable within the system (e.g., extending through the fluid outlet to allow a user to access and pull or otherwise manipulate the rod within the system) such that one or more characteristics of the system are correspondingly adjustable (e.g., a distance between the platform of the first portion and a base of the second portion, an effective pore size of the filter, an effective surface area of the filter, a compression of the filter, etc.). In some variations, the rod or strut may be rigid. In some variations, the rod or strut may be configured to releasably couple the first and second portions together (e.g., by coupling the distal end of the rod to the base portion of the second portion, where the proximal end of the strut is coupled to the platform of the first portion). In one example, the rod or strut may be flexible, like a zip tie, and may be configured to surround the system and adjustably couple via its respective ends.

The coupling mechanism may allow a user to achieve a desired amount of compression of the filter within the housing. For example, the coupling mechanism may allow a user to achieve a desired distance between the first portion platform and the second portion base, the desired distance corresponding to the desired amount of compression. As such, the coupling mechanism may be considered a compression mechanism.

In some variations, one or more portions of the housing (e.g., the top portion and the base portion) may include a visible marker for guiding use of the coupling mechanism. For example, the visual marker may include a first marker on the first portion and a second, corresponding marker on the second portion, where the housing is configured to apply a certain compression to the filter therein when the first and second markers are relatively aligned.

Filter

A filter (e.g., filter set 316 of FIG. 3) to be arranged within the filtration housings described herein may be a set of one or more filter membranes ("filter set") configured to filter one or more particles, such as one or more microbes, from a fluid. In some variations, the filter may additionally be configured to concentrate a retentate of a filtered fluid sample. For example, one or more membranes of a filter set may be a concentration filter membrane. In some variations, a pore size of the concentration membrane may be less than a pore size of a filtration membrane.

The filter may have any suitable number of membranes, such as between 1 and 20 membranes, between 2 and 16 membranes, between 3 and 12 membranes, or between 4 and 8 membranes. For example, the filter may be a filter set having at least two membranes. Membrane characteristics (e.g., material composition, weave, shape, pore size, thickness, surface area, etc.) of each membrane within a filter set may be independent of remaining membranes in the set. For example, a first filter of a filter set may be a filtration filter having a first pore size, and a second filter of the filter set may be a concentration filter having a second pore size. In some variations, each of the first and second pore sizes may be about equal to or greater than a size of a particle of interest. Additionally, or alternatively, in some variations, the second pore size may be greater than the first pore size.

The filter may be composed of any suitable material, such as one or more synthetic materials and/or one or more fibrous materials. Nonlimiting examples of suitable filter materials include cellulose acetate, cellulose nitrate, polyamide, polycarbonate, polypropylene, polytetrafluoroethylene, cotton, cellulose, glass fiber, and the like. The filter may also include a weave, such as a plain weave, a twill weave, and a satin weave. Further, the filter may have any suitable shape. Some nonlimiting examples of suitable filter shapes include a circular shape, a square shape, a rectangular shape, an ovular shape, and the like. In some variations, the filter may have an irregular shape. In some variations, a shape of the filter may be the same as or substantially similar to a shape of the filtration housing. For example, as shown in any of FIG. 5, the housing 502 may have a generally cylindrical shape, and the filter 516 may also have a substantially cylindrical shape. Correspondence between the shapes of the filter and housing may simplify arrangement of the filter within the housing. For example, in some variations, the filter may have a cross sectional dimension (e.g., a width or diameter) that is about equal to a cross sectional dimension (e.g., an inner width or diameter) of the housing. In alternate variations, the cross-sectional dimension (e.g., width or diameter) the filter may be less than the cross-sectional dimension (e.g., inner width or diameter) the housing, such as, for example, between about 4 mm and about 99 mm, such as between about 9 mm and about 89 mm, between about 14 mm and about 79 mm, or between about 19 mm and about 69 mm.

In some variations, the filter may include thin pieces of filter media. For example, one or more thin membranes of the filter may have a thickness (i.e., a height along a longitudinal axis of the filter) of between about 1 μm and about 5 mm, between about 10 μm and about 1 mm, between about 50 μm and about 500 μm, between about 100 μm and about 250 μm, or between about 150 μm and about 200 μm. As another example, a thickness of a filter membrane may be between about 0.1 mm and about 1 mm. In some variations, a thickness of a filter set including a plurality of filter membranes may be less than or about equal to the inner height of the housing. In other variations, the thickness of the filter set having a plurality of filter membranes may be less than the inner heigh of the housing. Generally, the thickness of the filter set may depend on a compression of the filter via the filtration housing (e.g., may vary with a changing height of the housing along a lateral axis of the housing). For example, a thickness of filters 616, 646 in FIGS. 6A and 6B vary with an inner height of the housings 602, 632 along the lateral axes x, x'. A maximum thickness of a filter set having a plurality of filter membranes may be between about 0.1 cm and about 45 cm, such as between about 0.2 cm and about 25 cm, between about 0.3 cm and about 15 cm, between about 0.4 cm and about 10 cm, between about 0.5 cm and about 5 cm, or between about 0.6 cm and about 1 cm.

Although thin pieces of filter media may be used for the filter, the systems described herein may be configured to relatively increase or otherwise adjust an effective surface area of the filter. For example, considering a filter set having a first membrane aligned with and stacked on top of a second membrane, compression of a central portion of the filter may cause the peripheral, uncompressed portions of the first and second membranes to separate from each other (i.e., along a longitudinal axis defined by the filter). That is, more surface area of a distal surface (underside) of the first membrane may be revealed, and, correspondingly, more surface area of a proximal (top side) surface of the second membrane may be revealed. Accordingly, a fluid sample may access and be filtered through more of the first and second filter membranes (relative to their wholly uncompressed or at-rest state), thus increasing the effective filtration area of the filter. This effect is depicted at least in FIGS. 2A-2B, FIGS. 6A-6B, where the peripheral filter portions (e.g., uncompressed portions 204, 224 in FIGS. 2A-2B and uncompressed portions 626, 656 in FIGS. 6A-6B) are spaced apart due to the compression of the central filter portions (e.g., compressed portions 218, 238 in FIGS. 2A-2B and compressed portions 614, 644 in FIGS. 6A-6B), making available more surface area configured for filtration along each filter membrane.

The effective surface area of the filter may be adjustable via adjustable compression of the filter within the housing. The compression may be controllable by simply increasing or decreasing the compression applied to the filter (e.g., manually or mechanically), or by changing a geometry and/or one or more dimensions of the platform and/or the base of the housing. Referring to FIG. 6A as an example, increasing the compression of the compressed portion 614 may increase an effective surface area of the uncompressed portions 626. Put another way, increasing the compression of the compressed portion 614 may increase an overall effective surface area of the filter 616. Additionally, or alternatively, adjusting a number of filter membranes within a filter set and subsequently compressing at least a portion of the filter set according to the systems, methods, and devices herein may adjust the effective surface area of the filter. The adjustable compression may yield a filter membrane having an effective surface area of about 3 $in^2$, about 4 $in^2$, about 4.5 $in^2$, about 5 $in^2$, about 5.5 $in^2$, about 6 $in^2$, about 6.5 $in^2$, about 7 $in^2$, about 8 $in^2$, about 9 $in^2$, or about 10 $in^2$. The effective surface area achieved by the systems and devices described herein may be greater than that of filters of traditional systems by, for example, about 100%, about 150%, about 175%, about 200%, about 250%, about 300%, about 350%, about 400%, about 450%, or about 500%. For example, traditional filtration devices and systems may only yield a filter membrane having an effective surface area of about 3 $in^2$, while the effective surface area for filtration achieved by the systems herein may be about 5 $in^2$, which is about 167% greater than the effective surface area of known systems.

The filter may include an effective pore size (e.g., minimum pore size, average pore size, range of pore sizes) configured to filter one or more particles of interest from a fluid. The pore size may be defined by a diameter of the pore(s). A minimum effective pore size (diameter) of the filter may be between about 0.1 μm and about 75 μm, such as between about 0.5 μm and about 50 μm, between about 1 μm and about 25 μm, between about 5 μm and about 20 μm, or between about 10 μm and about 15 μm. A range of effective pore sizes of the filter may be between about 0.1 μm and about 500 μm, such as between about 0.5 μm and about 400 μm, between about 1 μm and about 300 μm, between about 5 μm and about 200 μm, or between about 10 μm and about 100 μm. Generally, the pore size may be a plurality of effective pore sizes that depend on a compression of the filter via the filtration housing (e.g., may vary along a length of the filter, such as with a changing height of the housing chamber). For example, an effective pore size of the filters 616, 646 in FIGS. 6A and 6B vary with an inner height of the housings 602, 632 along the lateral axes x, x'. An effective pore sizes of an uncompressed portion of the filter (e.g., uncompressed portions 626, 656 in FIGS. 6A and 6B) may be greater than an effective pore size of a compressed portion of the filter (e.g., compressed portion 614, 644 in FIGS. 6A and 6B). For example, the uncompressed portion of the filter may include a range of pore sizes between about 1 μm and about 50 μm in diameter, while a compressed portion of the filter may include a range of effective of pore sizes between about 0.1 μm and about 30 μm in diameter.

As noted, a thickness and an effective pore size of the filter may be adjustable via adjustable compression of the filter within the housing. For example, referring again to FIG. 6A, the filter 616 may have a smallest thickness and smallest effective pore size at the compressed portion 614 and a largest thickness and largest effective pore size at the uncompressed portions 626. Considering a substantially circular or ovular filter set, an uncompressed portion of the filter set may be peripheral to, and extend radially from, a central compressed portion of the filter set.

Further, compression of the filter may induce a discrete or gradual gradation of effective membrane pore sizes (and filter thickness). As described above with respect to the first and second portions of the filtration housing, the distal end of the platform of the first portion housing and the proximal end of the base of the second portion of the housing having flat versus variable geometry may affect the compression of the filter between the two ends. Generally, the distal end of the platform and the proximal end of the base may be complementary. If the two ends are flat, the compression they apply to the filter therebetween may be substantially constant across a width or diameter of the compressed portion. However, if the two ends are, for example, stepped or ramped, their compression of the filter may be discrete or gradual across the width or diameter of the compressed portion of the filter, yielding a correspondingly discrete or gradual effective pore size gradation therein. That is, it may be desirable to generate a varying effective pore size within the compressed portion of the filter by varying the geometry of the platform and base, thus varying the gap between them and creating a variance in compression ratio within the filtration media.

Auxiliary Components

The system may include or be couplable to one or more additional components. The coupling (e.g., press-fit, snap-fit, magnets, fasteners, a rotational coupling, an adhesive, and/or welding) may be adjustable and/or releasable, or permanent. FIG. 1 and FIG. 10 show exemplary filtration systems 100, 1000 where the filtration housings 102, 1002 are releasably coupled to supplementary system components. Referring to FIG. 10 as an example, system 1000 includes enclosure 1004 coupled to a proximal end of housing 1002. The proximal end (e.g., fluid inlet 1009) of the housing 1002 is coupled to enclosure 1004 via enclosure outlet 1007. The enclosure 1004 may have an interior volume 1020 configured to receive a fluid. Further, the enclosure 1004 may be configured to be pressurized (e.g., sealed with a seal such as seal 111 in FIG. 1 and vacuum pressurized) such that a fluid therein is guided to and through the coupled filtration housing 1002. The enclosure 1004 may be a flexible material, a semi-flexible material, a semi-rigid material, a rigid material, or combinations thereof. In some variations, an enclosure may be a bag or a syringe. While the outlet 1007 is shown to extend beyond an exterior surface of the enclosure 1004, in some variations, the outlet 1007 may be within the enclosure (e.g., may extend inwards from an interior surface of the enclosure). Thus, the housing 1002 may also be received within the enclosure 1004 and couple to the outlet 1007 (e.g., the via fluid outlet 1011). For example, although housing 1002 is shown to be a cartridge configured to fully enclose filter 818, in some variations, the housing may instead be a cage (e.g., housing 502 in FIG. 5) configured to be housed completely within the enclosure 1004 such that fluid received within the enclosure 1004 may enter the housing through its apertures. Further, in this variation, a fluid outlet of the housing may couple to an inner portion of the enclosure and/or protrude through a wall of the enclosure.

FIG. 10 also shows a distal end of the housing 1002 (e.g., fluid outlet 1011) coupled to connector 1012. The connector 1012 may be configured to provide an indirect coupling of the housing 1002 to outlet extension 1010. The outlet extension 1010 may be configured to guide a filtrate from the housing 1002 to another system component (e.g., a receptacle for collecting the filtrate). While FIG. 10 depicts the housing 1002, connector 1012, and outlet extension 1010 connected in sequence, it should be understood that different configurations are possible. For example, in some variations, the outlet extension 1010 may couple directly to the housing 1002.

Methods

The following methods may be used with the filtration systems and devices described herein throughout. The methods described herein may apply to filtering a fluid during a food processing process, or for any suitable application involving filtering a fluid (e.g., for purifying drinking water).

Figure 11:
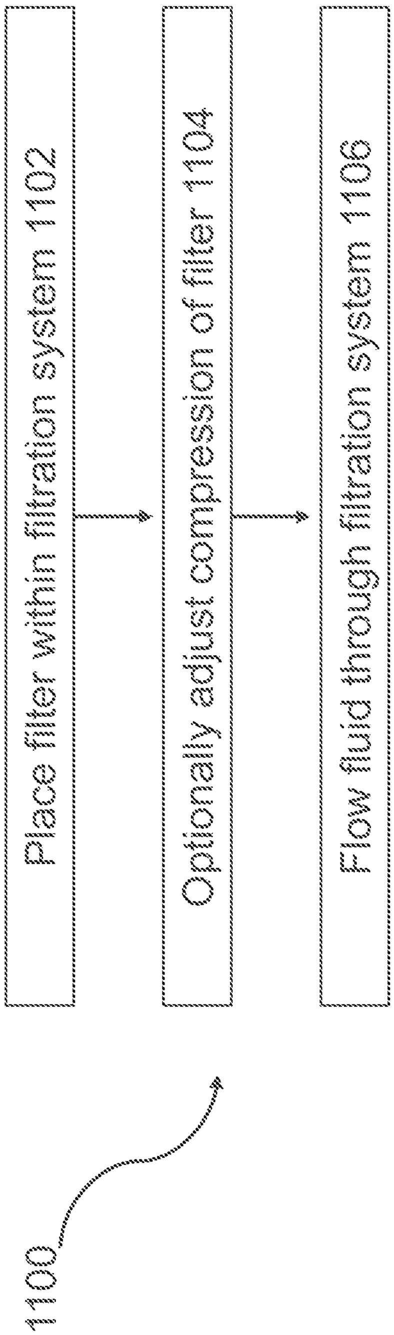
FIG. 11 is an illustrative flowchart representation of a method for using a filtration system, according to variations herein.

FIG. 11 is a flowchart representation of one variation of a method for filtering a fluid. While FIG. 11 shows that each step of method 1100 occurs one time, it should be understood that steps of the method 1100 may be repeated (e.g., step 1104 may be repeated any number of times until a desired compression is achieved), omitted (e.g., step 1104 may be omitted if adjustment of the compression is not desired), or reordered. Further, method 1100 may include feedback loops between steps (e.g., a feedback loop may exist between steps 1104 and 1106) and/or steps of method 1100 may be performed simultaneously.

In one variation, method 1100 may be used to filter a fluid using any of the various filtration systems and/or devices described herein. Method 1100 may include placing a filter within a filtration system 1102. The filter may be placed within a filtration housing (e.g., between a top portion platform and a base portion base) by a user. In some variations, the filter may be placed within the filtration housing before a top portion and a base portion of the housing are coupled. Alternatively, in some variations, the filter may be placed within the system following coupling of the top and base portions of the housing. For example, the filter may be folded or otherwise arranged so that it may be advanced through an aperture of a unitary housing having a cage structure. The filter may be configured to self-expand once it has been advanced through the housing aperture. As another example, the filter may be folded or otherwise arranged so that it may be advanced through a fluid outlet of the housing. Again, the filter may be configured to self-expand once it has been advanced through the fluid outlet.

Once the filter is within the filtration system, method 1100 may optionally include adjusting a compression of the filter 1104. Adjusting the compression of the filter 1104 may allow a user to switch between various predetermined compression ratios (and thus, effective pore sizes and effective surface areas) of the filter as needed (e.g., during a single filtering process, or during multiple filtering processing using the same filtration system). In some variations, this step may include adjusting a compression of a portion of the filter within first and second portions of the housing (e.g., a central compressed portion maintained between the platform and the base). Adjusting the compression may be achieved by one or more methods. For example, adjusting the compression may include rotating the top portion relative to the base portion (or vice versa) until a desired compression is achieved. As another example, adjusting the compression may include translating one or both of the top portion and the base portion longitudinally to increase or decrease a distance between the platform and the base. As yet another example, adjusting the compression may include fastening a ratcheting mechanism (e.g., a zip tie) through and around or onto one or more portions of the housing (e.g., through apertures in the platform, the filter, and the base and around exterior surfaces of the first and second supports), and tightening the ratcheting mechanism to increase compression of the filter within the housing (e.g., by pulling the platform and the base toward each other). In some variations, tightening the ratcheting mechanism may include locking the mechanism so that an amount of compression of the filter set is maintained by the mechanism. According to another example, adjusting the compression may include applying one or more clamps around at least a portion of the housing. Moreover, in variations where one or more portions of the housing (e.g., the top portion and/or the base portion) include a visible marker for helping a user track an amount of compression being applied to the filter, adjusting the compression may include using the visual marker to achieve a desired compression. For example, the visual marker may include a first marker on the top portion and a second, corresponding marker on the base portion, and adjusting the compression may include aligning the first and second markers relative to each other. Additionally, or alternatively, adjusting the compression may include increasing or decreasing a number of membranes within a filter set. Further, in some variations, adjusting the compression may include compressing at least a portion of an exterior of the filtration housing (e.g., using a mechanical press) such that a volume of the chamber within the housing is decreased. For example, a mechanical press may be used on a platform of a first portion of a filtration housing and/or on a base of a second portion of the housing to longitudinally translate the platform and/or the base to control a distance between the two, thereby controlling a volume of the chamber configured to receive the filter therein.

Finally, method 1100 may include flowing fluid through the filtration system 1106. Generally, fluid flow through a system as described herein may include a path through at least a portion of the filter and, subsequently, through the fluid outlet of the base portion. Flowing fluid through the system may include introducing fluid to the filter via at least one inlet or at least one aperture of the filtration housing. For example, fluid may be introduced to the filter via an inlet of a top portion of a housing having a cartridge structure (e.g., housing 532 in FIG. 5B). As another example, fluid may be introduced to the filter by submerging a housing having a cage structure within the fluid, allowing the fluid to flow through the apertures of the housing. Similarly, fluid may be introduced to the filter by pouring the fluid onto and/or about a housing having a cage structure, again allowing the fluid to flow through the apertures of the housing.

In some variations, a feedback loop may exist between the flowing 1106 and the optional adjusting 1104. For example, a user may adjust a compression of the filter and subsequently flow fluid through the filtration system any number of times during a single filtration process. As another example, a same filtration system may be used any number of times to perform multi-step filtration of a fluid, which may require a user to adjust a compression of the filter between each. In some variations, the optional adjusting 1104 and the flowing 1106 may be performed simultaneously. For example, a filtration housing may be configured to adjust a compression of a filter set therein while a fluid is being filtered through the system. Further, method 1100 may be repeated any number of times using a same filtration housing device to filter multiple fluids and/or to filter a fluid multiple times.

Method 1100 may include one or more additional steps. In some variations, a first additional step may include releasably coupling the filtration system to one or more components, such as the enclosure 104, the connector 1012, and/or the outlet extension 1010 of FIG. 10. For example, method 11 may include, prior to flowing the fluid through the system 1106, releasably coupling the filtration housing (having the filter compressed therein) to the enclosure. Releasably coupling the housing to the enclosure may include placing the housing within the enclosure and/or coupling a portion of the housing (e.g., a fluid inlet of the first housing portion or a fluid outlet of the second housing portion) to an outlet of the enclosure (e.g., enclosure outlet 1007 in FIG. 10). Next, a second additional step of method 1100 may include initially flowing the fluid into the enclosure. A third additional step of the method may then include sealing the enclosure (e.g., actuating seal 111 of enclosure 108 in FIG. 1). Subsequently, a fourth additional step of method 1100 may include pressurizing the enclosure so that the fluid is forced in a direction of the filtration housing having the filter therein.

Oppositely, in some variations, an additional step of method 1100 may include uncoupling the filtration system to one or more components (e.g., the enclosure 104, the connector 1012, and/or the outlet extension 1010 of FIG. 10).

In some variations, a first additional step of method 1100 may include collecting one or both of a filtrate (i.e., a liquid portion of the sample fluid having passed through the filter) and a retentate (i.e., one or more particles from the sample fluid). The filtrate may be collected via a fluid outlet of a base portion of a filtration housing, and the retentate may be collected from at least a portion of the filter (e.g., at least one membrane of a plurality of membranes of a filter set). A second additional step of method 1100 may include analyzing one or both of the collected filtrate and the collected retentate. Nonlimiting examples of methods for analyzing the retentate include use of a microbial cultivation, an immunological assay, a nucleic acid detection scheme, and/or a nucleic acid amplification method. If the retentate is collected for analysis, the method 1100 may further include identifying a collected particle (e.g., a microbe, a pathogen, a food particle, a contaminant, etc.).

Figure 12:
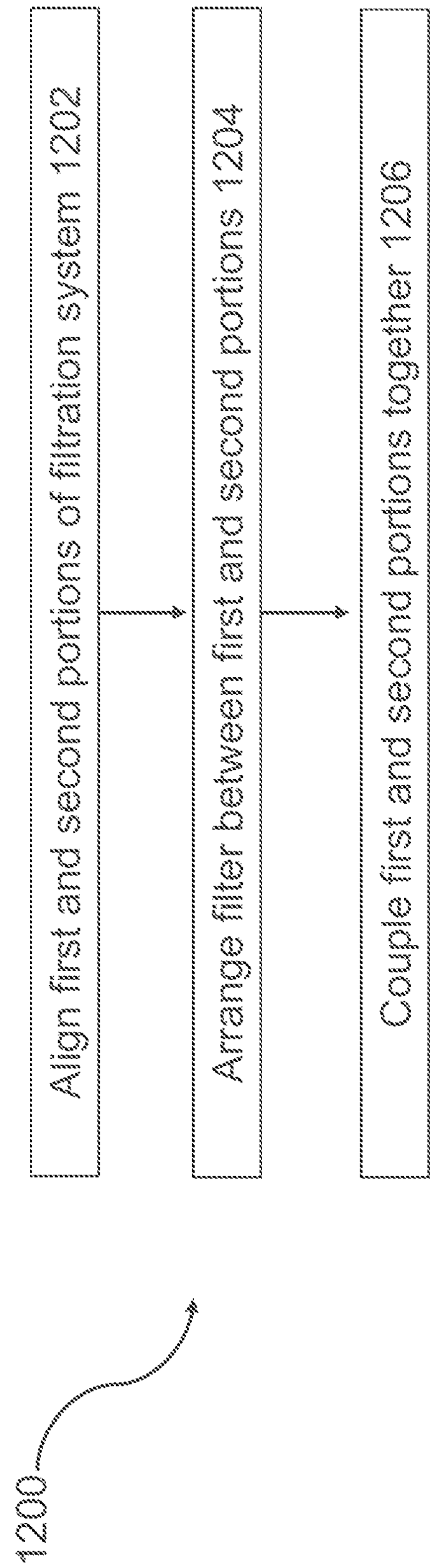
FIG. 12 is an illustrative flowchart representation of a method for manufacturing a filtration system, according to variations herein.

Referring to FIG. 12, a flowchart representation of one variation of a method for manufacturing a filtration system is illustrated. Like method 1100 of FIG. 11, while FIG. 12 shows that each step of method 1200 occurs one time, it should be understood that steps of the method 1200 may be repeated (e.g., step 1202 may be repeated any number of times until a correct alignment is achieved), omitted, or reordered (e.g., step 1204 may be occur prior to step 1106 if a filtration housing is configured to receive a filter after its first and second portions are coupled). Further, method 1200 may include feedback loops between steps and/or one or more steps of method 1200 may be performed simultaneously.

In one variation, method 1200 may be used to manufacture any of the various filtration systems and/or devices described herein. Method 1200 may first include aligning first and second portions of a filtration system (e.g., of a housing of the filtration system). Generally, the aligning may include aligning the first and second portions along central longitudinal and lateral axes defined by the filtration system. In some variations, aligning the first and second portions may include aligning the proximal end(s) of a support structure of the first portion relative to the distal end(s) of a support structure of the second portion. In some variations, aligning the first and second portions may include aligning a first part of a coupling mechanism (e.g., on the first portion) relative to a corresponding second part of the coupling mechanism (e.g., on the second portion). For example, the aligning may include aligning threads of a rotational coupling mechanism on the first portion (e.g., along an interior sidewall surface of the first portion) relative to corresponding threads on the second portion (e.g., along an exterior sidewall surface of the second portion). As another example, the aligning may include aligning grooves and ridges of the first portion relative to corresponding ridges and grooves of the second portion.

Next, method 1200 may include arranging a filter within aligned filtration system 1204. Generally, the filter may be arranged within the housing so that a portion of the filter to be compressed is between the top portion platform and the base portion base (e.g., a central portion of the filter may be aligned with the platform and the base). Each of a plurality of membranes within a filter set may be arranged independently or together within the filtration housing. Method 1200 may then include coupling the first and second portions of the housing together. Coupling the first and second housing portions may include temporarily or permanently joining the first and second portions so that a desired amount of compression of the filter within the housing is achieved. Additionally, or alternatively, coupling the first and second housing portions may include temporarily or permanently joining the first and second portions so that a desired distance between the first portion platform and the second portion base is achieved. In some variations, coupling the housing may include rotating, in one or more steps, the first portion relative to the second portion, or vice versa. In some variations, coupling the housing may include, in one or more steps, longitudinally translating the first portion relative to the second portion, or vice versa. For example, the first portion may be configured to press onto the second portion (e.g., via a press fit). Further, in some variations, coupling the first and second portions may include permanently connecting corresponding ends of the supports or extensions of the first and second portions. For example, coupling the first and second portions may include using welding (e.g., friction welding) to join one or more distal ends of the first support of the first portion and one or more corresponding proximal ends of the second support of the second portion.

In some variations, method 1200 may include one or more additional steps, such as, for example, coupling the filtration system to one or more components (e.g., the enclosure 1004, the connector 1012, and/or the outlet extension 1010 of FIG. 10).

EXAMPLES

Figure 13:
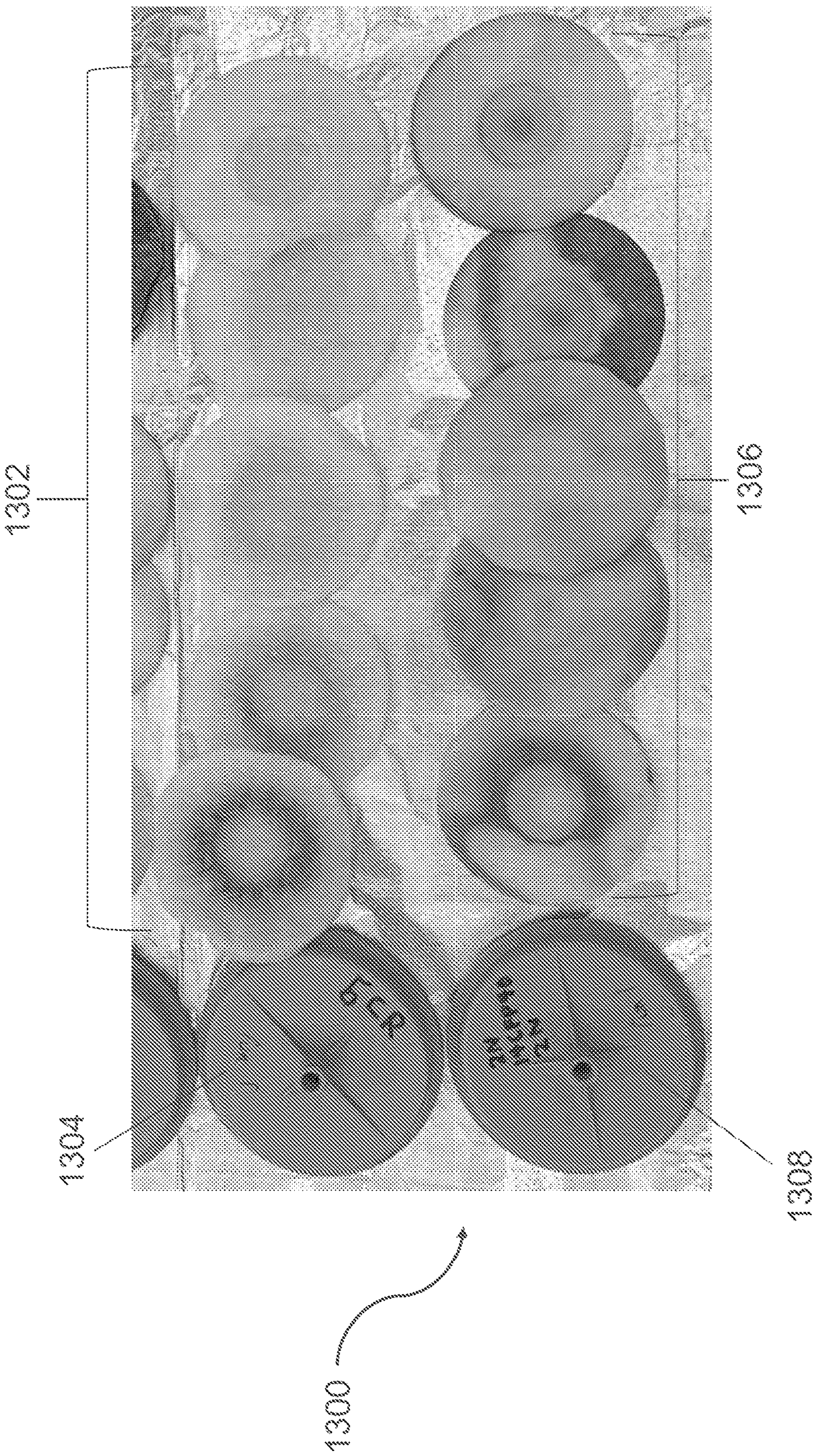
FIG. 13 shows an experimental result of using an example filtration system, according to variations herein.

FIG. 13 shows an experimental result of using a filtration system according to variations described herein. The experiment 1300 was a fluid filtration trial using two filtration systems and showed that the two systems filtered particles of various sizes through portions of their respective filters having a suitable effective pore size within a range of effective pore sizes and a suitable effective surface area of the filters.

The first five filter membranes of the first row defined a first filter set 1302, a central portion of which was compressed within the first filtration housing 1304, yielding a first trial filtration system. Likewise, the second five filter membranes of the second row defined a second filter set 1306, a central portion of which was compressed within the second filtration housing 1308, yielding a second trial filtration system. A first composition and pore size of the first filter set 1302 differed from a second composition and pore size of the second filter set 1306.

Approximately 500 mL of fluid containing 5 grams of dirt was passed through each of the first and second systems to measure fidelity of filtration. A patterning of dirt around a central filtration zone (i.e., a central compressed portion of each of the filter sets 1302, 1306) was observed. The significant darkness of the corona of the compressed zones and the peripheral uncompressed zones of each filter set 1302, 1306 indicated that a relatively higher concentration of large particles were deposited in these coronas compared to remaining portions of the filter sets 1302, 1306. Additionally, within the compressed zones, a gradient of smaller particle deposition was observed (toward a centermost point of the membranes defining each filter set 1302, 1306). This gradient demonstrated the capture of large particles away from the zone of filtration, and also demonstrated that fine-grained filtration occurred within the first and second compressed zones of filtration.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated.

NUMBERED EMBODIMENTS OF THE INVENTION

Notwithstanding the appended claims, the disclosure sets forth the following numbered embodiments:

(1) A microfiltration system, comprising: a housing comprising a top portion comprising an inlet disposed within a top wall of the top portion, and a stage coupled to and offset from the top wall by at least one strut; wherein the inlet is configured to receive a fluid, and a base portion couplable to the top portion and comprising a protruding outlet extending from a base wall of the base portion such that the outlet is offset from the base wall, wherein the top portion and the base portion, when coupled, form a chamber that is fluidically coupled to the inlet and the outlet, and a filter set configured to be received between the stage and the protruding outlet such that at least a portion of the filter set is compressed between the stage and protruding outlet.

(2) The microfiltration system of (1), wherein the stage and the inlet are aligned along a longitudinal axis of the housing.

(3) The microfiltration system of either (1) or (2), wherein the chamber is fluidically coupled to the inlet via apertures defined by the at least one strut that offsets the stage from the top wall.

(4) The microfiltration system of any one of (1) to (3), wherein the chamber comprises a substantially cylindrical shape.

(5) The microfiltration system of any one of (1) to (4), wherein the filter set comprises at least two membranes, and wherein each of the two membranes comprises a substantially cylindrical shape.

(6) The microfiltration system of any one of (1) to (5), wherein the inlet, the outlet, and the compressed portion of the filter set are aligned along a longitudinal axis of the housing.

(7) The microfiltration system of any one of (1) to (6), wherein an internal dimension of the chamber is greater than an external dimension of the filter set.

(8) The microfiltration system of (7), wherein the internal dimension of the chamber is between about 20 mm and about 70 mm.

(9) The microfiltration system of (7), wherein the external dimension of the filter set is between about 19 mm and about 69 mm.

(10) The microfiltration system of any one of (1) to (9), wherein the fluid comprises a liquid and particles.

(11) The microfiltration system of (10,) wherein the particles comprise food particles.

(12) The microfiltration system of (10), wherein the filter set is configured to filter the particles from the liquid as the fluid flows from the inlet to the outlet via the chamber.

(13) The microfiltration system of any one of (1) to (12), wherein the system comprises a central longitudinal axis and a lateral axis, wherein a center of the filter set aligns with the central longitudinal axis, and wherein an effective pore size of the filter set reduces along the lateral axis from an outer edge of the filter set to the center of the filter set.

(14) The microfiltration system of (13), wherein the effective pore size comprises a plurality of effective pore sizes.

(15) The microfiltration system of any one of (1) to (14), wherein the system comprises a central longitudinal axis and a lateral axis, wherein the compressed portion is aligned with the central longitudinal axis, and wherein an uncompressed portion of the filter set is peripheral to the compressed portion along the lateral axis.

(16) The microfiltration system of any one of (1) to (15), wherein the compressed portion of the filter set comprises a plurality of effective pore sizes ranging between about 0.1 μm and about 30 μm in diameter.

(17) The microfiltration system of any one of (1) to (16), wherein an uncompressed portion of the filter set comprises a plurality of effective pore sizes ranging between about 1 μm and about 50 μm in diameter.

(18) The microfiltration system of any one of (1) to (17), wherein a cross-sectional area of the stage is greater than a cross sectional area of the inlet.

(19) The microfiltration system of any one of (1) to (18), wherein the protruding outlet comprises an outer dimension and a conduit extending therethrough, the conduit having an inner dimension that is less than the outer dimension of the protruding surface.

(20) The microfiltration system of (19), wherein the outer dimension of the protruding outlet is between about 1.5 mm and about 50 mm.

(21) The microfiltration system of (19), wherein the inner dimension of the conduit is between about 1.6 mm and about 51 mm.

(22) The microfiltration system of any one of (1) to (21), wherein the at least one strut comprises a rigid material.

(23) The microfiltration system of any one of (1) to (22), wherein a distance between the stage and the protruding outlet is configured to be adjusted via an adjustable connection of the top portion and the base portion.

(24) The microfiltration system of (23), wherein the adjustable connection of the top and base portions corresponds to an adjustable compression of the filter set between the stage and the protruding outlet.

(25) The microfiltration system of (23), wherein the adjustable connection is a rotatable coupling.

(26) The microfiltration system of (23), wherein the adjustable connection is a translatable coupling along a longitudinal axis of the system.

(27) The microfiltration system of any one of (1) to (26), wherein the top portion comprises a threaded inner wall and the base portion comprises a complementary threaded outer wall.

(28) The microfiltration system of any one of (1) to (27), wherein the filter set comprises a plurality of membranes.

(29) The microfiltration system of (28), wherein each of the plurality of membranes comprises a thickness between about 0.1 mm and about 1 mm.

(30) The microfiltration system of (28), wherein a number of the plurality of membranes is adjustable.

(31) The microfiltration system of any one of (1) to (30), wherein a minimum effective pore size of the filter set is equal to or greater than a size of a microbe.

(32) The microfiltration system of any one of (1) to (32), wherein the protruding outlet is offset from the base wall by a distance of between about 0.3 mm and about 50 mm.

(33) The microfiltration system of any one of (1) to (32) further comprising an enclosure configured to receive the fluid and to couple to the inlet to dispense the fluid into the chamber of the housing.

(34) The microfiltration system of (33), wherein the enclosure comprises one or more of a flexible material, a semi-flexible material, a semi-rigid material, and a rigid material.

(35) The microfiltration system of (33), wherein the enclosure comprises a bag.

(36) The microfiltration system of (33), wherein the enclosure comprises a syringe.

(37) The microfiltration system of any one of (1) to (36), wherein the compressed portion of the filter set comprises a compressed pore size when the top and base portions are coupled and a nominal pore size when the top and base portions are not coupled.

(38) A method for filtering a fluid with a microfiltration system, the method comprising:

placing a filter set into a chamber defined by a coupling of a top portion of a housing and a base portion of the housing, the top portion comprising an inlet disposed within a top wall of the top portion, the inlet configured to receive a fluid, and a stage coupled to and offset from the top wall by at least one strut, the base comprising a protruding outlet extending from a base wall of the base portion such that the protruding outlet is offset from the base wall, wherein the chamber is fluidically coupled to the inlet and to the protruding outlet; coupling the top portion and the base portion such that the filter set is in contact with and between the stage and the protruding surface of the outlet, the contact causing compression of at least a portion of the filter set; and flowing the fluid through the inlet, wherein the fluid comprises at least one particle.

(39) The method of (38) further comprising collecting the particle from the filter set.

(40) The method of (39) further comprising analyzing the collected particle to identify a pathogen.

(41) The method of (40) wherein analyzing the collected particle comprises using one or more of a microbial cultivation, an immunological assay, a nucleic acid detection scheme, and a nucleic acid amplification method.

(42) The method of any one of (38) to (41) wherein coupling the top and base portions comprises rotating the top portion relative to the base portion.

(43) The method of any one of (38) to (42) wherein the microfiltration system comprises a longitudinal axis, and wherein coupling the top and base portions comprises translating the top portion relative to the base portion along the longitudinal axis.

(44) The method of any one of (38) to (43) further comprising adjusting the compression of the compressed portion of the filter set by increasing a coupling force between the top portion and the base portion.

(45) The method of (44), wherein at least one of the top portion and the base portion comprises a visible marker to aid in the adjusting.

(46) The method of any one of (45), wherein the base portion comprises the visible marker, and wherein increasing the coupling force comprises rotating or translating the top portion relative to the base portion such that the at least a portion of the visible marker is covered by the top portion.

(47) The method of any one of (38) to (46), wherein an internal dimension of the chamber is greater than an external dimension of the filter set.

(48) The method of (47), wherein the internal dimension of the chamber is between about 20 mm and about 70 mm.

(49) The method of (47), wherein the external dimension of the filter set between about 19 mm and about 69 mm.

(50) The method of any one of (38) to (49), wherein the fluid comprises a liquid and the at least particle.

(51) The method of any one of (38) to (50), wherein the filter set comprises a plurality of membranes.

(52) The method of (51), wherein each of the plurality of membranes comprises a thickness of between about 0.1 mm and about 1 mm.

(53) The method of (51), wherein the plurality of membranes comprises at least 2 membranes.

(54) The method of (53) further comprising adjusting a number of the plurality of membranes of the filter to adjust the compression of the compressed portion of the filter set.

(55) The method of (54), wherein the adjusting comprises increasing the number of the plurality of membranes such that the compression of the compressed portion of the filter set increases and a plurality of effective pore sizes of the compressed portion of the filter decreases.

(56) The method of any one of (38) to (55) further comprising prefiltering the fluid with a filter bag.

(57) The method of any one of (38) to (56) further comprising: prior to flowing the fluid through the inlet, flowing the fluid into an enclosure configured to couple to the inlet; and introducing the fluid into the inlet via an enclosure.

(58) The method of (57), wherein the enclosure comprises one or more of a flexible material, a semi-flexible material, a semi-rigid material, and a rigid material.

(59) The method of (57), wherein the enclosure comprises a bag.

(60) The method of (57), wherein the enclosure comprises a syringe.

(61) A microfiltration system, comprising a filter set; a top portion comprising a platform having a strut extending therefrom, the strut configured to pass through a center of the filter set; and a base portion comprising a base having a fluid outlet, wherein the filter set is configured to be received between the platform and the base such that at least a portion of the filter set is compressed between the platform and the base; and a compression mechanism couplable to the strut, wherein the compression mechanism is configured to translate the strut along a longitudinal axis of the system to adjust a compression of the filter set between the platform and the base.

(62) The microfiltration system of (61), wherein the strut is configured to pierce the center of the filter set.

(63) The microfiltration system of either (61) or (62), wherein the strut, the fluid outlet, and the compressed portion of the filter set are aligned along the longitudinal axis of the system.

(64) The microfiltration system of any one of (61) to (63), wherein the fluid outlet is configured to receive the strut therethrough.

(65) The microfiltration system of any one of (61) to (64), wherein the compression mechanism comprises a first end couplable to the strut and a second end couplable to the base portion.

(66) The microfiltration system of (65), wherein the compression mechanism is releasably couplable to one or both of the strut and the base portion.

(67) The microfiltration system of (65), wherein the compression mechanism comprises a ratcheting mechanism.

(68) The microfiltration system of any one of (61) to (67), wherein the platform is configured to be translated along the longitudinal axis of the system via longitudinal translation of the strut by the compression mechanism.

(69) The microfiltration system of any one of (61) to (68), wherein the compression mechanism is configured increase the compression of the filter set via distal translation of the strut along the longitudinal axis such that a distance between the platform and the base decreases.

(70) The microfiltration system of any one of (61) to (69), wherein the compression mechanism is configured decrease the compression of the filter set via proximal translation of the strut along the longitudinal axis such that a distance between the platform and the base increases.

(71) The microfiltration system of any one of (61) to (70), wherein the compression mechanism is further configured to lock the strut at a position along the longitudinal axis of the system to maintain the compression of the filter set within the platform and the base.

(72) The microfiltration system of any one of (61) to (71), wherein the filter set comprises at least two membranes.

(73) The microfiltration system of any one of (61) to (72), wherein the filter set is configured to filter a fluid.

(74) The microfiltration system of (73), wherein the filter set comprises a central aperture configured to receive the strut, and wherein an inner dimension of the central aperture is about equal to an outer dimension of the strut such that the fluid is inhibited from passing through the aperture.

(75) The microfiltration system of any one of (61) to (74), wherein the fluid outlet is configured to receive the strut longitudinally therethrough.

(76) The microfiltration system of any one of (61) to (75), wherein the filter set comprises a maximum thickness between about 0.6 cm and about 1 cm along the longitudinal axis.

(77) The microfiltration system of any one of (61) to (76) further comprising a cage configured to encompass the filter set, the cage comprising a first end coupled to the platform of the top portion and a second end coupled to the base of the base portion.

(78) The microfiltration system of (77), wherein the cage comprises two or more legs, and wherein each of the two or more legs is couplable to the top portion at the first end and to the base portion at the second end.

(79) The microfiltration system of (77), wherein the cage comprises a flexible material configured to conform to a thickness of the compressed portion of the filter set.

(80) The microfiltration system of (79), wherein the thickness is adjustable by via one or both of an adjustable distance between the platform and the base and an adjustable number of membranes within the filter set.

(81) The microfiltration system of any one of (61) to (80), wherein the top portion comprises an outer dimension that is less than an outer dimension of the filter set.

(82) The microfiltration system of any one of (61) to (81), wherein the base portion comprises an outer dimension that is less than an outer dimension of the filter set.

(83) The microfiltration system of any one of (61) to (82), wherein each of a plurality of membranes within the filter set comprises a substantially cylindrical shape.

(84) The microfiltration system of any one of (61) to (83), wherein each of a plurality of membranes within the filter set comprises a thickness between about 0.1 mm and about 1 mm.

(85) The microfiltration system of any one of (61) to (84), wherein a minimum effective pore size of the filter set is equal to or greater than the size of a microbe.

(86) The microfiltration system of any one of (61) to (85), wherein, when the filter set is received between the platform and the base, the top portion, the base portion, and the filter set are configured to be submerged in a fluid for filtering.

(87) The microfiltration system of (86), wherein the fluid comprises a liquid and particles.

(88) The microfiltration system of (87), wherein the particles comprise food particles.

(89) The microfiltration system of (86), wherein an exterior of the filter set is exposed such that the filter set is configured to directly receive the fluid from 360 degrees.

(90) The microfiltration system of any one of (61) to (89), wherein, when the filter set is received between the platform and the base, an average effective pore size of the filter set reduces transversely from an outer edge of the filter set to the center of the filter set.

(91) The microfiltration system of any one of (61) to (90), wherein the compressed portion of the filter set is centrally aligned along the longitudinal axis, and an uncompressed portion of the filter set is peripheral to the compressed portion along a transverse axis of the system.

(92) The microfiltration system of any one of (61) to (91), wherein the compressed portion of the filter set comprises a plurality of effective pore sizes ranging between about 0.1 μm and about 30 μm in diameter.

(93) The microfiltration system of any one of (61) to (92), wherein an uncompressed portion of the filter set comprises a plurality of effective pore sizes ranging between about 1 μm and about 50 μm in diameter.

(94) The microfiltration system of any one of (61) to (93), wherein a cross-sectional area of the base portion is greater than a cross sectional area of the fluid outlet.

(95) The microfiltration system of any one of (61) to (94), wherein the compressed portion of the filter set comprises a compressed pore size when the top and base portions are coupled and a nominal pore size when the top and base portions are not coupled.

(96) The microfiltration system of any one of (61) to (95) further comprising an enclosure configured to receive the top portion, the filter set, the base portion, and the fluid.

(97) The microfiltration system of (96), wherein at least a portion of the base portion extends beyond an exterior surface of the enclosure such that the fluid exits the enclosure by flowing through the filter set and subsequently through the fluid outlet of the base portion.

(98) The microfiltration system of (96), wherein the enclosure comprises a bag.

(99) The microfiltration system of any one of (61) to (98) further comprising a receptacle for collecting filtered fluid from the fluid outlet.

(100) A microfiltration system, comprising a housing comprising: a top portion comprising a platform and a first extension coupled to and extending from the platform, and a base portion comprising a base having a fluid outlet extending therethrough and a second extension coupled to and extending from the base, wherein the first and second extensions are configured to be coupled, and wherein, when the first and second extensions are coupled, the housing is configured to hold a filter set between the platform and the base such that at least a portion of the filter set is compressed between the platform and the base.

(101) The microfiltration system of (100), wherein the first extension comprises a first lateral portion and a first vertical portion, and the second extension comprises a second lateral portion and a second vertical portion.

(102) The microfiltration system of (101), wherein the first and second lateral portions extend parallel to each other along a lateral axis of the housing.

(103) The microfiltration system of (102), wherein the first and second lateral portions extend radially along the lateral axis.

(104) The microfiltration system of (102), wherein the first lateral portion comprises a first inner end coupled to the platform and a first outer end coupled to the first vertical portion, and wherein the second lateral portion comprises a second inner end coupled to the base and a second outer end coupled to the second vertical portion.

(105) The microfiltration system of (101), wherein the first and second lateral portions comprise a same length.

(106) The microfiltration system of (101), wherein the first vertical portion extends distally along a longitudinal axis of the housing, and wherein the second vertical portion extends proximally along the longitudinal axis.

(107) The microfiltration system of (101), wherein the first and second vertical portions comprise a same length.

(108) The microfiltration system of (101), wherein the first and second extensions are couplable via the first and second vertical portions.

(109) The microfiltration system of any of (100) to (108), wherein the first and second extensions are couplable via one or more of a press-fit, a snap-fit, a magnet, a fastener, a rotational coupling, an adhesive, and welding.

(110) The microfiltration system of (109), wherein the welding comprises friction welding.

(111) The microfiltration system of any of (100) to (110), wherein the welding comprises friction welding.

(112) The microfiltration system of any of (100) to (111), wherein the platform is distally offset from an interior wall of the top portion.

(113) The microfiltration system of (112), wherein the platform is coupled to the interior wall of the top portion via one or more struts.

(114) The microfiltration system of any of (100) to (113), wherein the top portion further comprises a fluid inlet configured to receive a fluid.

(115) The microfiltration system of any of (100) to (114), wherein the base is proximally offset from an interior wall of the base portion.

(116) The microfiltration system of any of (100) to (115), wherein the base extends distally from an exterior wall of the base portion.

(117) The microfiltration system of any of (100) to (116), wherein the housing comprises one or more of a flexible material, a semi-flexible material, a semi-rigid material, and a rigid material (118) The microfiltration system of any of (100) to (117), wherein the housing is a chamber configured to enclose the filter set.

(119) The microfiltration system of any of (100) to (118), wherein the housing is a cage configured to expose the filter set.

(120) The microfiltration system of any of (100) to (119), wherein the filter set comprises a first membrane having a proximal surface and a first sidewall and a second membrane having a distal surface and a second sidewall.

(121) The microfiltration system of (120), wherein an exterior of the filter set comprises at least the proximal surface, the distal surface, and the first and second sidewalls, and wherein the housing is configured to expose a majority of the exterior of the filter set.

(122) The microfiltration system of (121), wherein each of the proximal surface, the distal surface, and the first and second sidewalls comprise an exposed portion configured to receive a fluid and an unexposed portion covered by an area of the housing (123) The microfiltration system of (120), wherein the proximal surface of the first membrane is adjacent the top portion and the distal surface of the second membrane is adjacent the base portion.

(124) The microfiltration system of any of (100) to (123), wherein the filter set is configured to filter a fluid comprising or suspected to comprise a microbe.

(125) The microfiltration system of any of (100) to (124), wherein a cross sectional width or diameter of the housing is about equal to or greater than a cross sectional width or diameter of the filter set.

(126) The microfiltration system of any of (100) to (125), wherein a height of the housing is about equal to or greater than a thickness of the filter set.

(127) The microfiltration system of any of (100) to (126), wherein the compressed portion of the filter set is aligned with a center of the housing, and wherein an uncompressed portion of the filter set is peripheral to the compressed portion.

(128) The microfiltration system of (127), wherein the uncompressed portion of the filter set extends laterally and radially from the compressed portion.

(129) The microfiltration system of (127), wherein the compressed portion comprises a first thickness, wherein the uncompressed portion comprises a first end adjacent the compressed portion and a second end lateral to the first end and adjacent a sidewall of the filter set, the second end comprising a second thickness, and wherein the first thickness is less than the second thickness.

(130) The microfiltration system of (129), wherein a thickness of the filter set increases from the first end of the uncompressed portion to the second end of the uncompressed portion.

(131) The microfiltration system of any of (100) to (130), wherein the filter set comprises membranes having an average effective pore size that varies along a lateral axis of the housing when the filter set is between the platform and the base.

(132) The microfiltration system of (131), wherein the compressed portion of the filter set comprises a smallest average effective pore size of the filter set.

(133) The microfiltration system of any of (100) to (132) further comprising an enclosure configured to receive a fluid and guide the fluid toward the filter set within the housing.

(134) The microfiltration system of (133), wherein the enclosure comprises one or more of a flexible material, a semi-flexible material, a semi-rigid material, and a rigid material.

(135) The microfiltration system of (133), wherein the enclosure comprises a bag.

(136) The microfiltration system of (133), wherein the enclosure comprises an outlet configured to releasably couple to a portion of the housing.

(137) The microfiltration system of (136), wherein at least a portion of the outlet is exterior to the enclosure and configured to couple to a fluid inlet of the top portion of the housing.

(138) The microfiltration system of (136), wherein at least a portion of the outlet is within the enclosure and configured to couple to the fluid outlet of the base portion of the housing.

(139) A method for filtering a fluid with a microfiltration system, the method comprising: arranging a filter set within a housing, the housing comprising a top portion comprising a platform and a first extension coupled to and extending from the platform, and a base portion comprising a base having a fluid outlet extending therethrough and a second extension coupled to and extending from the base, wherein the top and bottom portions are configured to be coupled, and wherein the housing is configured to hold the filter set such that at least a portion of the filter set is compressed between the platform and the base; adjusting a compression of the filter set; and flowing the fluid through the microfiltration system, wherein the fluid comprises or is suspected to comprise a particle.

(140) The method of (139), wherein adjusting the compression comprises changing a distance between the platform and the base.

(141) The method of (140), wherein changing the distance comprises adjusting a coupling at an interface between the first extension and the second extension.

(142) The method of any of (139) to (141), wherein adjusting the compression comprises changing a number of membranes within the filter set to change a thickness of the filter set.

(143) The method of any of (139) to (142), further comprising, prior to flowing the fluid through the microfiltration system: flowing the fluid through an enclosure configured to couple to the housing; and pressurizing the enclosure to guide the fluid is forced toward the housing and the filter set.

(144) The method of any of (139) to (143), wherein the particle comprises one or more food particles.

(145) The method of any of (139) to (144), wherein the particle comprises one or more microbes.

(146) The method of any of (139) to (145), wherein adjusting the compression adjusts an effective pore size and an effective surface area of the filter set.

(147) A method for manufacturing a microfiltration system, the method comprising: aligning a top portion and a base portion of a housing, the top portion comprising a platform and a first extension coupled to and extending from the platform, and the base portion comprising a base having a fluid outlet extending therethrough and a second extension coupled to and extending from the base; arranging a filter set between the top portion and the base portion; and coupling the top portion and the base portion such that at least a portion of the filter set is compressed between the platform and the base.

(148) The method of (147), wherein coupling the top and base portions comprises coupling the first and second extensions.

(149) The method of either (147) or (148), wherein coupling the top and base portions comprises using one or more of a press-fit, a snap-fit, a magnet, a fastener, a rotational coupling, an adhesive, and welding.

(150) The method of (149), wherein the welding comprises one or more of friction welding, laser welding, thermal impulse welding, solvent welding, and infrared welding.

(151) The method of (150), wherein the friction welding comprises one or more of friction stir welding, friction stir spot welding, linear friction welding, and ultrasonic welding.

(152) The method of any of (147) to (151), wherein coupling the top portion and the base portion adjusts an effective pore size and an effective surface area of the filter set therebetween.

We claim:

1. A microfiltration system, comprising:

a housing comprising:
- a top portion comprising:
  - a platform; and
  - a first extension coupled to and extending from the platform; and
- a base portion comprising:
  - a base having a fluid outlet extending therethrough; and
  - a second extension coupled to and extending from the base,
- wherein the first and second extensions are configured to be coupled,
- wherein, when the first and second extensions are coupled, the housing is configured to hold a filter set between the platform and the base such that at least a portion of the filter set is compressed between the platform and the base, and wherein the platform is distally offset from an interior wall of the top portion.

2. The system of claim 1, wherein the first extension comprises a first lateral portion and a first vertical portion, and the second extension comprises a second lateral portion and a second vertical portion.

3. The system of claim 2, wherein the first and second lateral portions extend parallel to each other along a lateral axis of the housing.

4. The system of claim 3, wherein the first and second lateral portions extend radially along the lateral axis.

5. The system of claim 3, wherein the first lateral portion comprises a first inner end coupled to the platform and a first outer end coupled to the first vertical portion, and wherein the second lateral portion comprises a second inner end coupled to the base and a second outer end coupled to the second vertical portion.

6. The system of claim 2, wherein the first and second extensions are couplable via the first and second vertical portions.

7. The system of claim 1, wherein the first and second extensions are couplable via one or more of a press-fit, a snap-fit, a magnet, a fastener, a rotational coupling, an adhesive, and welding.

8. The system of claim 1, wherein each of the first and second extensions comprise at least two legs configured to align relative to each other and couple together.

9. The system of claim 1, wherein the platform is coupled to the interior wall of the top portion via one or more struts.

10. The system of claim 1, wherein the top portion further comprises a fluid inlet configured to receive a fluid.

11. The system of claim 1, wherein the base is proximally offset from an interior wall of the base portion.

12. The system of claim 1, wherein the base extends distally from an exterior wall of the base portion.

13. The system of claim 1, wherein the housing is a chamber configured to enclose the filter set.

14. The system of claim 1, wherein the housing is a cage configured to expose the filter set.

15. The system of claim 1, wherein the filter set comprises a first membrane having a proximal surface and a first sidewall and a second membrane having a distal surface and a second sidewall.

16. The system of claim 15, wherein an exterior of the filter set comprises at least the proximal surface, the distal surface, and the first and second sidewalls, and wherein the housing is configured to expose a majority of the exterior of the filter set.

17. The system of claim 1, wherein a cross sectional width or diameter of the housing is about equal to or greater than a cross sectional width or diameter of the filter set.

18. The system of claim 1, wherein a height of the housing is about equal to or greater than a thickness of the filter set.

19. The system of claim 1, wherein the compressed portion of the filter set is aligned with a center of the housing, and wherein an uncompressed portion of the filter set is peripheral to the compressed portion.

20. The system of claim 1, wherein the filter set comprises membranes having an average effective pore size that varies along a lateral axis of the housing when the filter set is between the platform and the base.

* * * * *